United States Patent
Wu et al.

(10) Patent No.: US 12,256,460 B2
(45) Date of Patent: Mar. 18, 2025

(54) DISCONTINUOUS RECEPTION OPERATIONS FOR WIRELESS COMMUNICATIONS SYSTEMS

(71) Applicant: QUALCOMM Incorporated, San Diego, CA (US)

(72) Inventors: Zhibin Wu, Los Altos, CA (US); Hong Cheng, Basking Ridge, NJ (US); Kapil Gulati, Belle Mead, NJ (US); Tien Viet Nguyen, Bridgewater, NJ (US); Junyi Li, Fairless Hills, PA (US); Sudhir Kumar Baghel, Pleasanton, CA (US)

(73) Assignee: QUALCOMM Incorporated, San Diego, CA (US)

( * ) Notice: Subject to any disclaimer, the term of this patent is extended or adjusted under 35 U.S.C. 154(b) by 100 days.

(21) Appl. No.: 18/154,672

(22) Filed: Jan. 13, 2023

(65) Prior Publication Data
US 2023/0156860 A1    May 18, 2023

Related U.S. Application Data

(62) Division of application No. 16/996,738, filed on Aug. 18, 2020, now Pat. No. 11,570,843.
(Continued)

(51) Int. Cl.
*H04W 76/28* (2018.01)
*H04W 4/40* (2018.01)
(Continued)

(52) U.S. Cl.
CPC ............. *H04W 76/28* (2018.02); *H04W 4/40* (2018.02); *H04W 24/08* (2013.01);
(Continued)

(58) Field of Classification Search
CPC ....... H04W 76/28; H04W 76/27; H04W 4/40; H04W 24/08; H04W 28/0268; H04W 92/18
(Continued)

(56) References Cited

U.S. PATENT DOCUMENTS 9,924,503 B2   3/2018  Kim et al.
10,219,312 B2  2/2019  Yang et al.
(Continued)

FOREIGN PATENT DOCUMENTS

WO   WO2018045192 A1   3/2018
WO   WO-2018085024     5/2018
WO   WO-2018202798 A1  11/2018

OTHER PUBLICATIONS

Al-Kubati G., et al., "Fast and Reliable Hybrid Routing for Vehicular Ad hoc Networks", 2013 13th International Conference on its Telecommunications (ITST), IEEE, Nov. 5, 2013 (Nov. 5, 2013), pp. 20-25, XP032532106, DOI: 10.1109/ITST.2013.6685515 [retrieved on Dec. 16, 2013] p. 1.
(Continued)

*Primary Examiner* — Mong-Thuy T Tran
(74) *Attorney, Agent, or Firm* — Holland & Hart LLP

(57) ABSTRACT

Methods, systems, and devices for wireless communications are described. A user equipment (UE) of a group of UEs may receive, from a group member of the group of UEs, traffic information including a transmission schedule associated with traffic of the group member UE. The UE may determine a discontinuous reception configuration for the group of UEs based at least in part on the transmission schedule. The discontinuous reception configuration may include a discontinuous reception schedule for the group of UEs. The UE may transmit, to the group of UEs, the discontinuous reception configuration.

16 Claims, 11 Drawing Sheets

Related U.S. Application Data

(60) Provisional application No. 62/891,017, filed on Aug. 23, 2019.

(51) Int. Cl.
| | | |
|---|---|---|
| *H04W 24/08* | (2009.01) | |
| *H04W 28/02* | (2009.01) | |
| *H04W 76/27* | (2018.01) | |
| *H04W 92/18* | (2009.01) | |

(52) U.S. Cl.
CPC ....... *H04W 28/0268* (2013.01); *H04W 76/27* (2018.02); *H04W 92/18* (2013.01)

(58) Field of Classification Search
USPC .......................................................... 370/329
See application file for complete search history.

(56) References Cited

U.S. PATENT DOCUMENTS

| | | | |
|---|---|---|---|
| 2017/0289910 | A1 | 10/2017 | Islam et al. |
| 2018/0213365 | A1* | 7/2018 | Yi ........................... H04W 4/06 |
| 2018/0234977 | A1 | 8/2018 | Yasukawa et al. |
| 2018/0310147 | A1* | 10/2018 | Kim .................... H04W 68/005 |
| 2019/0045405 | A1 | 2/2019 | Byun et al. |
| 2019/0059056 | A1 | 2/2019 | Islam et al. |
| 2019/0159280 | A1 | 5/2019 | Chakraborty et al. |
| 2019/0289615 | A1 | 9/2019 | Lee et al. |
| 2020/0092685 | A1 | 3/2020 | Fehrenbach et al. |
| 2020/0196321 | A1 | 6/2020 | Zhang et al. |
| 2021/0059004 | A1 | 2/2021 | Wu et al. |
| 2021/0184984 | A1* | 6/2021 | Ganesan ............... H04W 72/20 |
| 2021/0392584 | A1 | 12/2021 | Reial et al. |
| 2022/0061068 | A1* | 2/2022 | Liu ..................... H04W 68/005 |
| 2022/0408226 | A1* | 12/2022 | Fehrenbach .... H04W 36/00692 |
| 2022/0417854 | A1* | 12/2022 | Park .................. H04W 52/0235 |

OTHER PUBLICATIONS

International Preliminary Report on Patentability—PCT/US2020/046944, The International Bureau of WIPO—Geneva, Switzerland, Mar. 3, 2022.

International Search Report and Written Opinion—PCT/US2020/046944—ISA/EPO—Oct. 26, 2020.

LG Electronics Inc: "Relay Reselection Procedure for Remote UE", 3GPP Draft; R2-1703329, 3GPP TSG-RAN WG2 Meeting #97 bis, Relay Reselection Procedure for Remote UE, 3rd Generation Partnership Project (3GPP), Mobile Competence Centre, 650, Route Des Lucioles, F-06921 Sophia-Antipolis Cedex, France, vol. RAN WG2, No. Spokane, Washington, USA, Apr. 3, 2017-Apr. 7, 2017, Mar. 24, 2017 (Mar. 24, 2017), XP051253877, pp. 1-4, pp. 1, 3, Figure 1.

Sequans Communications: "Sidelink Maintenance for Evolved L2 Relay", 3GPP Draft, 3GPP TSG-RAN WG2#98, R2-1705126—Sidelink Maintenance for Evolved L2 Relay, 3rd Generation Partnership Project (3GPP), Mobile Competence Centre, 650, Route Des Lucioles, F-06921 Sophia-Antipolis Cedex, France, vol. RAN WG2, No. Hangzhou, China, May 15, 2017-May 19, 2017, May 14, 2017 (May 14, 2017), XP051275602, 4 Pages, pp. 1, 3.

ZTE: "Discussion on PC5 DRX", 3GPP Draft, 3GPP TSG-RAN WG2 Meeting #98, R2-1704634, Discussion on PC5 DRX, 3rd Generation Partnership Project (3GPP), Mobile Competence Centre, 650, Route Des Lucioles, F-06921 Sophia-Antipolis Cedex, France, vol. RAN WG2, No. Hangzhou, China, May 15, 2017-May 19, 2017, May 14, 2017 (May 14, 2017), XP051275179, 4 pages, the whole document, p. 1-p. 3, Figure 3.

Sequans Communications: "Sidelink Maintenance for Evolved L2 Relay", 3GPP TSG-RAN WG2#98, R2-1705126, Hangzhou, China, May 15, 2017-May 19, 2017, 4 Pages May 19, 2017, The whole Document.

ZTE: "Discussion on PC5 DRX", 3GPP TSG-RAN WG2 Meeting #98, R2-1704634, 3rd Generation Partnership Project, Mobile Competence Centre, 650, Route Des Lucioles, F-06921 Sophia-Antipolis Cedex, France, vol. RAN WG2, No. Hangzhou, China, May 15, 2017-May 19, 2017, May 14, 2017, XP051275179, 4 pages, The Whole Document.

\* cited by examiner

DISCONTINUOUS RECEPTION OPERATIONS FOR WIRELESS COMMUNICATIONS SYSTEMS

CROSS REFERENCE

The present Application for Patent is a Divisional of U.S. patent application Ser. No. 16/996,738 by W U et al., entitled "DISCONTINUOUS RECEPTION OPERATIONS FOR WIRELESS COMMUNICATIONS SYSTEMS" filed Aug. 18, 2020, which claims the benefit of U.S. Provisional Patent Application No. 62/891,017 by W U et al., entitled "DISCONTINUOUS RECEPTION OPERATIONS FOR WIRELESS COMMUNICATIONS SYSTEMS," filed Aug. 23, 2019, assigned to the assignee hereof, and expressly incorporated by reference herein.

FIELD OF TECHNOLOGY

The following relates generally to wireless communications and more specifically to discontinuous reception (DRX) operations for wireless communications systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems may support both access links and sidelinks. An access link is a communication link between a UE and a base station. In some examples, an access link may be referred to as a Uu interface. Specifically, the Uu interface may refer to an over-the-air interface for downlink transmissions, uplink transmissions, or both. A sidelink is a communication link between similar devices. For example, a sidelink may support communications between multiple UEs (e.g., in a vehicle-to-everything (V2X) system, a vehicle-to-vehicle (V2V) system, a device-to-device (D2D) system, among other examples). In some examples, a sidelink may support unicast messaging, groupcast messaging, multicast messaging, broadcast messaging, or combinations thereof. In such systems, efficient power saving techniques may be desirable.

SUMMARY

The described techniques relate to improved methods, systems, devices, and apparatuses that support discontinuous reception (DRX) operations for wireless communications systems. Generally, the described techniques provide for efficient power saving techniques and reliable communications. The described techniques may enable a user equipment (UE) in a wireless communications system (e.g., a vehicle-to-everything (V2X) system, a vehicle-to-vehicle (V2V) network, a cellular V2X (C-V2X) network, a device-to-device (D2D) system, and the like) to determine and implement a DRX configuration for a group of UEs. For example, a group leader UE of the group of UEs may receive traffic information from the group of UEs. The group leader UE may consolidate the traffic information and determine a group DRX configuration for the group of UEs. The group leader UE may transmit the group DRX configuration to the group of UEs in a groupcast message, which may provide the group of UEs power savings enhancements while providing efficient and reliable communications.

A method of wireless communications at a first UE of a group of UEs is described. The method may include receiving, from a second UE of the group of UEs, traffic information including a transmission schedule associated with traffic of the second UE, determining a DRX configuration for the group of UEs based on the transmission schedule associated with the traffic of the second UE, the DRX configuration including a DRX schedule for the group of UEs, and transmitting, to the group of UEs, the DRX configuration.

An apparatus of a group of apparatuses for wireless communications is described. The apparatus may include a processor, memory coupled with the processor, and instructions stored in the memory. The instructions may be executable by the processor to cause the apparatus to receive, from a second apparatus of the group of apparatuses, traffic information including a transmission schedule associated with traffic of the second apparatus, determine a DRX configuration for the group of apparatuses based on the transmission schedule associated with the traffic of the second apparatus, the DRX configuration including a DRX schedule for the group of apparatuses, and transmit, to the group of apparatuses, the DRX configuration.

Another apparatus of a group of apparatuses for wireless communications is described. The apparatus may include means for receiving, from a second apparatus of the group of apparatuses, traffic information including a transmission schedule associated with traffic of the second apparatus, determining a DRX configuration for the group of apparatuses based on the transmission schedule associated with the traffic of the second apparatus, the DRX configuration including a DRX schedule for the group of apparatuses, and transmitting, to the group of apparatuses, the DRX configuration.

A non-transitory computer-readable medium storing code for wireless communications at a first UE of a group of UEs is described. The code may include instructions executable by a processor to receive, from a second UE of the group of UEs, traffic information including a transmission schedule associated with traffic of the second UE, determine a DRX configuration for the group of UEs based on the transmission schedule associated with the traffic of the second UE, the DRX configuration including a DRX schedule for the group of UEs, and transmit, to the group of UEs, the DRX configuration.

Some examples of the method, apparatuses, and non-transitory computer-readable medium described herein may further include operations, features, means, or instructions for consolidating the traffic information of the second UE into group traffic information of the group of UEs, where determining the DRX configuration may be based on the group traffic information.

In some examples of the method, apparatuses, and non-transitory computer-readable medium described herein, consolidating the traffic information of the second UE into the group traffic information of the group of UEs comprises may include operations, features, means, or instructions for allocating resources requested by the second UE based on a priority indicated by the traffic information from the second UE, the discontinuous reception configuration, or both, where the allocated resources satisfy one or more thresholds associated with the priority, the discontinuous reception configuration, or both.

Some examples of the method, apparatuses, and non-transitory computer-readable medium described herein may further include operations, features, means, or instructions for transmitting an acknowledgement to the second UE based on the traffic information including the transmission schedule associated with the traffic of the second UE.

In some examples of the method, apparatuses, and non-transitory computer-readable medium described herein, the traffic information comprises a group identifier, a member identifier, a data rate, a periodicity, an offset, a quality of service (QoS) profile, a side link group identifier, a side link member identifier, a buffered data amount, a QoS indicator, a combination thereof.

Some examples of the method, apparatuses, and non-transitory computer-readable medium described herein may further include operations, features, means, or instructions for transmitting an adjustment message to the second UE based on the traffic information including the transmission schedule associated with the traffic of the second UE, the adjustment message indicating to adjust one or more transmissions of the transmission schedule.

Some examples of the method, apparatuses, and non-transitory computer-readable medium described herein may further include operations, features, means, or instructions for receiving, by a vehicle-to-everything layer of the first UE from an upper layer of the first UE, a configuration message including an indication that the first UE may be a group leader of the group of UEs, where transmitting, to the group of UEs, the DRX configuration may be based on the first UE being the group leader of the group of UEs.

In some examples of the method, apparatuses, and non-transitory computer-readable medium described herein, the configuration message includes a group leader identifier.

In some examples of the method, apparatuses, and non-transitory computer-readable medium described herein, the group leader identifier may be a layer two identifier.

In some examples of the method, apparatuses, and non-transitory computer-readable medium described herein, receiving the traffic information may include operations, features, means, or instructions for receiving, from an application layer of the first UE, one or more of the traffic information of the second UE or one or more additional UEs of the group of UEs.

Some examples of the method, apparatuses, and non-transitory computer-readable medium described herein may further include operations, features, means, or instructions for determining an awake period associated with a DRX cycle, where the DRX configuration includes an indication of the awake period associated with the DRX cycle.

Some examples of the method, apparatuses, and non-transitory computer-readable medium described herein may further include operations, features, means, or instructions for terminating the DRX configuration based on the awake period associated with the DRX cycle lapsing, where the DRX configuration includes an indication of the DRX configuration terminating based on the awake period associated with the DRX cycle lapsing.

Some examples of the method, apparatuses, and non-transitory computer-readable medium described herein may further include operations, features, means, or instructions for determining multiple awake periods associated with multiple DRX cycles, where the DRX configuration includes an indication of the multiple awake periods associated with the multiple DRX cycles.

Some examples of the method, apparatuses, and non-transitory computer-readable medium described herein may further include operations, features, means, or instructions for determining a traffic change associated with the group of UEs based on group traffic information, and terminating the DRX configuration over the multiple awake periods associated with the multiple DRX cycles based on the traffic change.

Some examples of the method, apparatuses, and non-transitory computer-readable medium described herein may further include operations, features, means, or instructions for performing a resource management operation for the group of UEs based on the DRX configuration.

Some examples of the method, apparatuses, and non-transitory computer-readable medium described herein may further include operations, features, means, or instructions for including the DRX configuration in a groupcast message, where transmitting, to the group of UEs, the DRX configuration includes transmitting, to each UE of the group of UEs, the groupcast message carrying the DRX configuration.

Some examples of the method, apparatuses, and non-transitory computer-readable medium described herein may further include operations, features, means, or instructions for including the DRX configuration in a PC5 radio resource control message, where transmitting, to the group of UEs, the DRX configuration includes transmitting, to each UE of the group of UEs, the PC5 radio resource control message carrying the DRX configuration.

Some examples of the method, apparatuses, and non-transitory computer-readable medium described herein may further include operations, features, means, or instructions for including the DRX configuration in a medium access control-control element message, where transmitting, to the group of UEs, the DRX configuration includes transmitting, to each UE of the group of UEs, the medium access control-control element message carrying the DRX configuration.

Some examples of the method, apparatuses, and non-transitory computer-readable medium described herein may further include operations, features, means, or instructions for configuring the DRX configuration over a single DRX cycle or multiple DRX cycles, and enabling a field in a message carrying the DRX configuration based on the configuring, the field including a Boolean indication of the single DRX cycle or the multiple DRX cycles, where transmitting, to the group of UEs, the DRX configuration includes transmitting, to each UE of the group of UEs, the message.

In some examples of the method, apparatuses, and non-transitory computer-readable medium described herein, the group of UEs correspond to a vehicle-to-everything wireless communications system.

A method of wireless communications at a first UE of a group of UEs is described. The method may include identifying, by the first UE in the group of UEs, that a second UE in the group of UEs is a group leader of the group of UEs, monitoring a resource based on identifying that the second UE is designated as the group leader, and receiving, from the second UE, a group configuration message indicating a DRX configuration based on monitoring the resource.

An apparatus of a group of apparatuses for wireless communications is described. The apparatus may include a processor, memory coupled with the processor, and instructions stored in the memory. The instructions may be executable by the processor to cause the apparatus to identify that a second apparatus in the group of apparatuses is a group leader of the group of apparatuses, monitor a resource based on identifying that the second apparatus is designated as the group leader, and receive, from the second apparatus, a group configuration message indicating a DRX configuration based on monitoring the resource.

Another apparatus of a group of apparatuses for wireless communications is described. The apparatus may include means for identifying that a second apparatus in the group of apparatuses is a group leader of the group of apparatuses, monitoring a resource based on identifying that the second apparatus is designated as the group leader, and receiving, from the second apparatus, a group configuration message indicating a DRX configuration based on monitoring the resource.

A non-transitory computer-readable medium storing code for wireless communications at a first UE of a group of UEs is described. The code may include instructions executable by a processor to identify, by the first UE in the group of UEs, that a second UE in the group of UEs is a group leader of the group of UEs, monitor a resource based on identifying that the second UE is designated as the group leader, and receive, from the second UE, a group configuration message indicating a DRX configuration based on monitoring the resource.

Some examples of the method, apparatuses, and non-transitory computer-readable medium described herein may further include operations, features, means, or instructions for transmitting, to the second UE, traffic information including a transmission schedule associated with traffic of the first UE.

Some examples of the method, apparatuses, and non-transitory computer-readable medium described herein may further include operations, features, means, or instructions for receiving, from the second UE, an acknowledgment message based on transmitting the traffic information, and transmitting one or more transmissions associated with the transmission schedule based on the acknowledgment message.

Some examples of the method, apparatuses, and non-transitory computer-readable medium described herein may further include operations, features, means, or instructions for receiving, from the second UE, an adjustment message based on transmitting the traffic information, and adjusting one or more transmissions associated with the transmission schedule based on the adjustment message.

In some examples of the method, apparatuses, and non-transitory computer-readable medium described herein, transmitting the traffic information further may include operations, features, means, or instructions for transmitting a PC5 radio resource control message to the second UE, the PC5 radio resource control message including the traffic information of the first UE.

In some examples of the method, apparatuses, and non-transitory computer-readable medium described herein, the traffic information includes a group identifier, a member identifier, a data rate, a periodicity, an offset, a QoS profile, or a combination thereof.

In some examples of the method, apparatuses, and non-transitory computer-readable medium described herein, transmitting the traffic information further may include operations, features, means, or instructions for transmitting a medium access control-control element message to the second UE, the medium access control-control element message including the traffic information of the first UE.

In some examples of the method, apparatuses, and non-transitory computer-readable medium described herein, the traffic information includes a side link group identifier, a side link member identifier, a buffered data amount, a QoS indicator, or a combination thereof.

In some examples of the method, apparatuses, and non-transitory computer-readable medium described herein, the DRX configuration indicates an awake period associated with a DRX cycle.

Some examples of the method, apparatuses, and non-transitory computer-readable medium described herein may further include operations, features, means, or instructions for monitoring, during the awake period of the DRX cycle, for transmissions from the group of UEs, and terminating the DRX configuration based on the awake period associated with the DRX cycle lapsing.

Some examples of the method, apparatuses, and non-transitory computer-readable medium described herein may further include operations, features, means, or instructions for monitoring, during the multiple awake periods associated with the multiple DRX cycles, for transmissions from the group of UEs.

Some examples of the method, apparatuses, and non-transitory computer-readable medium described herein may further include operations, features, means, or instructions for receiving, during an awake period of the multiple awake periods and a DRX cycle of the multiple DRX cycles, a termination message from the second UE, the termination message indicating that the DRX configuration may be terminated for subsequent DRX cycles.

In some examples of the method, apparatuses, and non-transitory computer-readable medium described herein, identifying that the second UE may be the group leader of the group of UEs further may include operations, features, means, or instructions for receiving, from an upper layer of the first UE, a message indicating that the second UE may be the group leader of the group of UEs.

In some examples of the method, apparatuses, and non-transitory computer-readable medium described herein, identifying that the second UE may be the group leader of the group of UEs further may include operations, features, means, or instructions for determining that the second UE may be a leader of a platoon including the first UE, that the second UE may be a roadside unit, that the second UE performs a resource management operation for the group of UEs, or a combination thereof.

DETAILED DESCRIPTION

Figure 1:
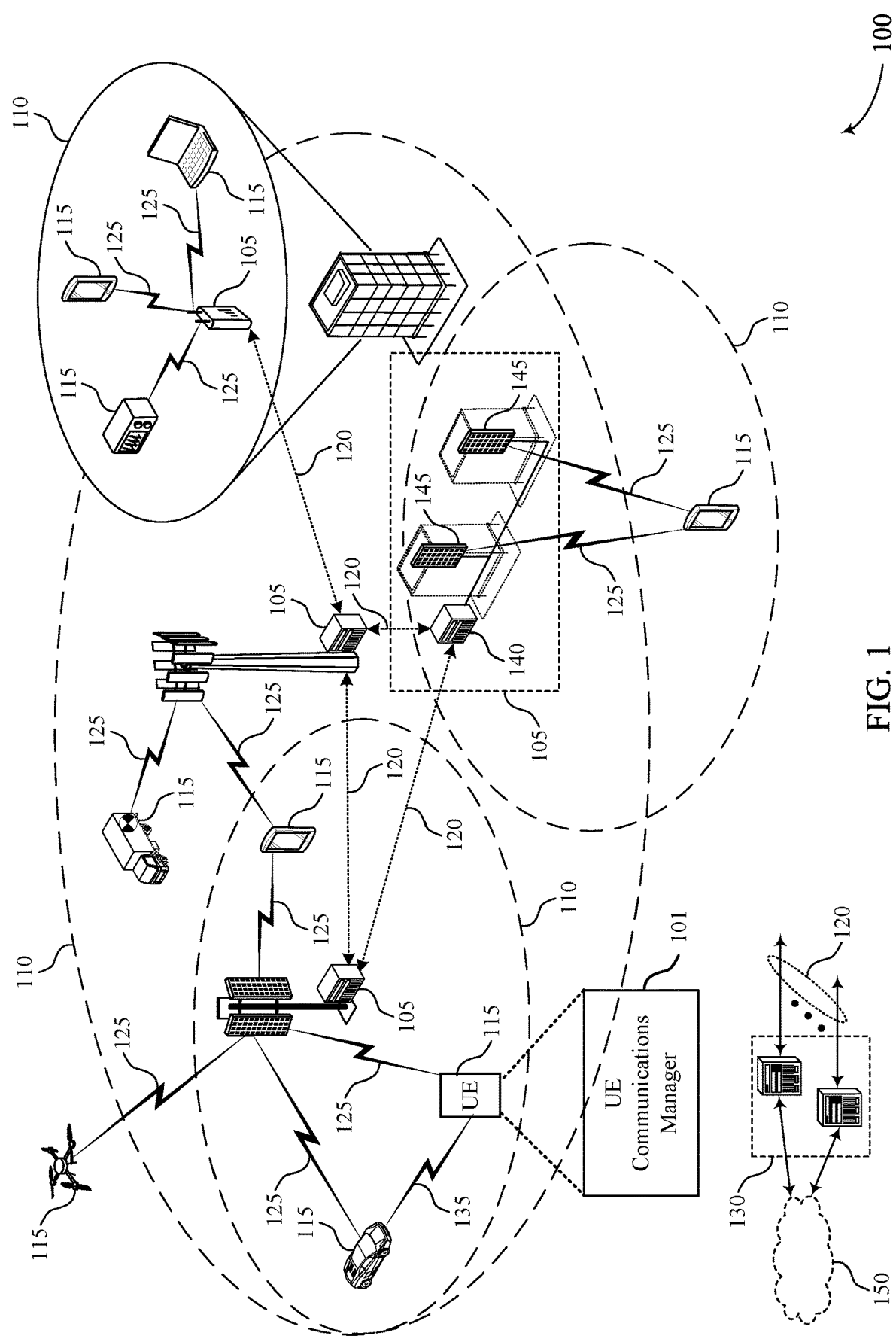
FIG. 1 illustrates an example of a system for wireless communications that supports discontinuous reception (DRX) operations for wireless communications systems in accordance with aspects of the present disclosure.

A wireless communications system may support both access links and sidelinks for communications between wireless devices. An access link may refer to a communication link between a user equipment (UE) and a base station. For example, an access link may support uplink signaling, downlink signaling, connection procedures, etc. A sidelink may refer to any communication link between similar wireless devices (e.g., a communication link between UEs, or a backhaul communication link between base stations). It is noted that while various examples provided herein are discussed for UE sidelink devices, such sidelink techniques may be used for any type of wireless devices that use sidelink communications. For example, a sidelink may support one or more of device-to-device (D2D) communications, vehicle-to-everything (V2X) or vehicle-to-vehicle (V2V) communications, message relaying, discovery signaling, beacon signaling, or other signals transmitted over-the-air from one UE to one or more other UEs.

Sidelink communications may support communications within a group of UEs. For example, sidelink communications may include communications between a UE and other UEs within a coverage area including the group of UEs (e.g., a coverage area provided by a base station, a coverage area outside of the coverage area provided by the base station, or a combination thereof). One or more of the UEs in the group of UEs may initiate sidelink communications with other UEs in the group of UEs. For example, a UE may have information to transmit to the group of UEs (e.g., a detection of an object or obstacle on a road in a V2X system, scheduling information, among other examples) and the UE may initiate a groupcast sidelink communication including the information to the other UEs. The other UEs may monitor sidelink resource pools for the sidelink communication. In some cases, such monitoring for sidelink communications by UEs may be continuous to ensure sidelink transmissions are not missed, and the UEs may consume excess power as a result. In some other cases, various configurations of the UEs (e.g., configured by a Uu interface with a base station) may cause a UE to miss the sidelink communications due to failing to monitor the resource pools based on an inactivity timer (e.g., the UE may be configured to enter a sleep mode after failing to detect transmissions for a period of time), which may result in unreliable communications.

However, as described herein, power saving techniques for sidelink communications may be used to enable reduced power consumption and extended battery life while ensuring reliable and efficient communications in the group of UEs. The power saving techniques may be implemented in part by a group leader of the group of UEs. In some examples, the group leader may be a UE including leader functions (e.g., special access stratum (AS) layer functions) among the group of UEs. The UE may perform resource management for the group of UEs (e.g., the UE may be a road-side unit (RSU), a leader of a platoon of UEs such as vehicles in a V2X system, among other examples). In some examples, the UE may be configured or designated as the group leader. For example, management of the group of UEs may occur at an application layer. In such examples, the group leader UE may be selected at an upper layer and the upper layer may notify the group leader UE or the group of UEs of the group leader identification (ID). The upper layer may configure the group leader to perform some or all of the leader operations as described herein.

The group leader UE may receive traffic information from the group of UEs. For example, the group leader UE may receive transmission schedules from one or more of the UEs in the group of UEs. The group leader UE may consolidate the traffic information and determine a group discontinuous reception (DRX) configuration for the group of UEs which may enable power savings for the group of UEs as described herein. The group leader UE may use explicit signaling to trigger the DRX configuration, which may enable a UE of the group of UEs to stay awake (e.g., continue to monitor resource pools) if a sidelink communication is not received to additionally ensure reliable communications. In some examples, the group leader UE may transmit the group DRX configuration in a groupcast message. In such examples, the group leader UE may configure the group of UEs with the group DRX configuration (e.g., a DRX schedule shared amongst the group of UEs) for at least one DRX cycle. The group of UEs may monitor sidelink resource pools for a relatively small awake period (e.g., an ON duration) of the DRX cycle based on the configuration. Additionally or alternatively, the group leader UE may configure the group of UEs with the group DRX configuration for multiple DRX cycles. That is, the DRX configuration may indicate multiple awake periods for multiple DRX cycles. Through one or any combination of the described techniques, UEs may implement various schemes for power savings enhancements, thereby improving battery life and reducing unnecessary power consumption at the UE while providing efficient and reliable communications on a sidelink.

Aspects of the disclosure are initially described in the context of wireless communications systems. Aspects of the disclosure are further illustrated by and described with reference to apparatus diagrams, system diagrams, and flowcharts that relate to DRX operations for wireless communications systems.

FIG. 1 illustrates an example of a wireless communications system 100 that supports DRX operations for wireless communications systems in accordance with aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, and/or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 megahertz (MHz)). Devices of the wireless communications system 100 (e.g., base stations 105, UEs 115, or both) may have hardware configurations that support communications over a particular carrier bandwidth or may be configurable to support communications over one of a set of carrier bandwidths. In some examples, the wireless communications system 100 may include base stations 105 and/or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

Time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some cases, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or various combinations thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, exterior spaces between or overlapping with geographic coverage areas 110, or the like.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to UEs 115 with service subscriptions with the network provider or may provide restricted access to UEs 115 having an association with the small cell (e.g., UEs 115 in a closed subscriber group (CSG), UEs 115 associated with users in a home or office, and the like). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB), or others) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a predefined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some cases, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

UEs 115 and base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some cases, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 may monitor a communication link 125 (e.g., a wireless link) 115 continuously for an indication that the UE 115 may receive data or for a data transmission. In other cases (e.g., to conserve power and extend battery life) a UE 115 may be configured with a DRX cycle. A DRX cycle consists of an "On Duration" (i.e., an awake period) when the UE 115 may monitor for communications (e.g., from a base station 105 and/or from another UE 115) and a "DRX period" when the UE 115 may power down radio components. In some cases, the DRX cycle and/or the continuous reception may be controlled by an internal timer. For example, while monitoring for a scheduling message, the UE 115 may initiate a "DRX Inactivity Timer". If a scheduling message is successfully received, the UE 115 may prepare to receive data and the DRX Inactivity Timer may be reset. When the DRX Inactivity Timer expires without receiving a scheduling message, the UE 115 may refrain from further monitoring for the rest of the DRX cycle (e.g., the UE 115 may power down radio components). Additionally or alternatively, the UE 115 may move into a short DRX cycle and may start a "DRX Short Cycle Timer". When the DRX Short Cycle Timer expires, the UE 115 may enter a long DRX cycle (e.g., power down radio components for a relatively longer time period). However, the use of such timers may be inefficient in some wireless communications systems. For example, the inactivity timers may increase the likelihood that a UE in a group of UEs (e.g., communicating over a sidelink communication link 135) may fail to receive a sidelink group communication.

Accordingly, wireless communications system 100 may support various techniques for power savings when communicating in a group of UEs. As an example, a UE 115 may be a group leader of the group of UEs (e.g., configured by an upper layer to be the group leader, a UE 115 that performs group leader functions for the group of UEs, or a combination thereof). The UE 115 may receive traffic information of other UEs 115 (e.g., from an upper layer, from the RRC layer of the other UEs 115, or both). The UE 115 may consolidate the received traffic information and determine a DRX configuration for the group of UEs. For example, the UE 115 may determine a DRX schedule indicating one or more DRX cycles for the group of UEs 115. In some cases, the UE 115 may broadcast the DRX configuration to the group of UEs 115, provide an acknowledgement message and/or an adjustment message to another UE 115 in response to a request included in the traffic information of the other UE 115, among other operations. Such a group leader UE 115 may enable the group of UEs 115 to reduce power consumption (e.g., compared to continuous monitoring) while maintaining reliable communications.

In some examples, the other UEs 115 in the group of UEs 115 may be referred to as "member" UEs 115. A member UE 115 may communicate with the group of UEs 115 using sidelink communications. The member UE 115 may identify the group leader UE 115 (e.g., based on a notification from an upper layer, determining the group leader UE 115 based on information from the AS layer, or both). For example, an RSU may be configured to act as the group leader, or a platoon leader may be configured to act as the group leader.

Such configuration may be from application layer group management signaling, and informed to the V2X layer or AS layer (e.g., RRC layer) of the UEs 115 via internal interfaces. Additionally or alternatively, a group leader selection signaling protocol may be run among the group members (e.g., in the platooning case), such that the group leader may be selected and made known to all other UEs 115 at the AS layer. Such signaling may be done at the V2X layer, for example, using the PC5-S protocol messages or PC5 RRC message. The PC5-S message may be sent to all the group members in a groupcast mode. The PC5 RRC message may be sent in the groupcast mode or a unicast mode. The member UE 115 may provide traffic information (e.g., a group member ID, a transmission schedule of the member UE 115, and the like) to the group leader UE 115 and/or an upper layer. In some examples, the member UE 115 may continuously monitor for sidelink communications from the group of UEs 115. The member UE 115 may receive a DRX configuration from the group leader UE 115 (e.g., based on an announcement or groupcast transmission from the group leader UE 115) and implement the DRX configuration in order to save power. For example, the DRX configuration may include a DRX schedule indicating that each member UE 115 of the group of UEs 115 may communicate during an awake period and power off radio components during a DRX period of a DRX cycle. The DRX configuration may be for a single DRX cycle or multiple DRX cycles.

One or more of the UEs 115 may include a UE communications manager 101, which may receive, from another UE 115, traffic information including a transmission schedule associated with traffic of the other UE 115, determine a DRX configuration for the group of UEs 115 based on the traffic information of one or more UEs 115, the DRX configuration including a DRX schedule for the group of UEs 115, and broadcast, to the group of UEs 115, the DRX configuration.

The UE communications manager 101 may also identify that another UE 115 in the group of UEs is a group leader UE 115, monitor a resource (e.g., sidelink resource pools) based on identifying the group leader UE 115, and receive, from the group leader UE 115, a group configuration message indicating DRX configuration based on monitoring the resource. The UE communications manager 102 may be an example of aspects of the UE communications manager 415 described herein.

Figure 2:
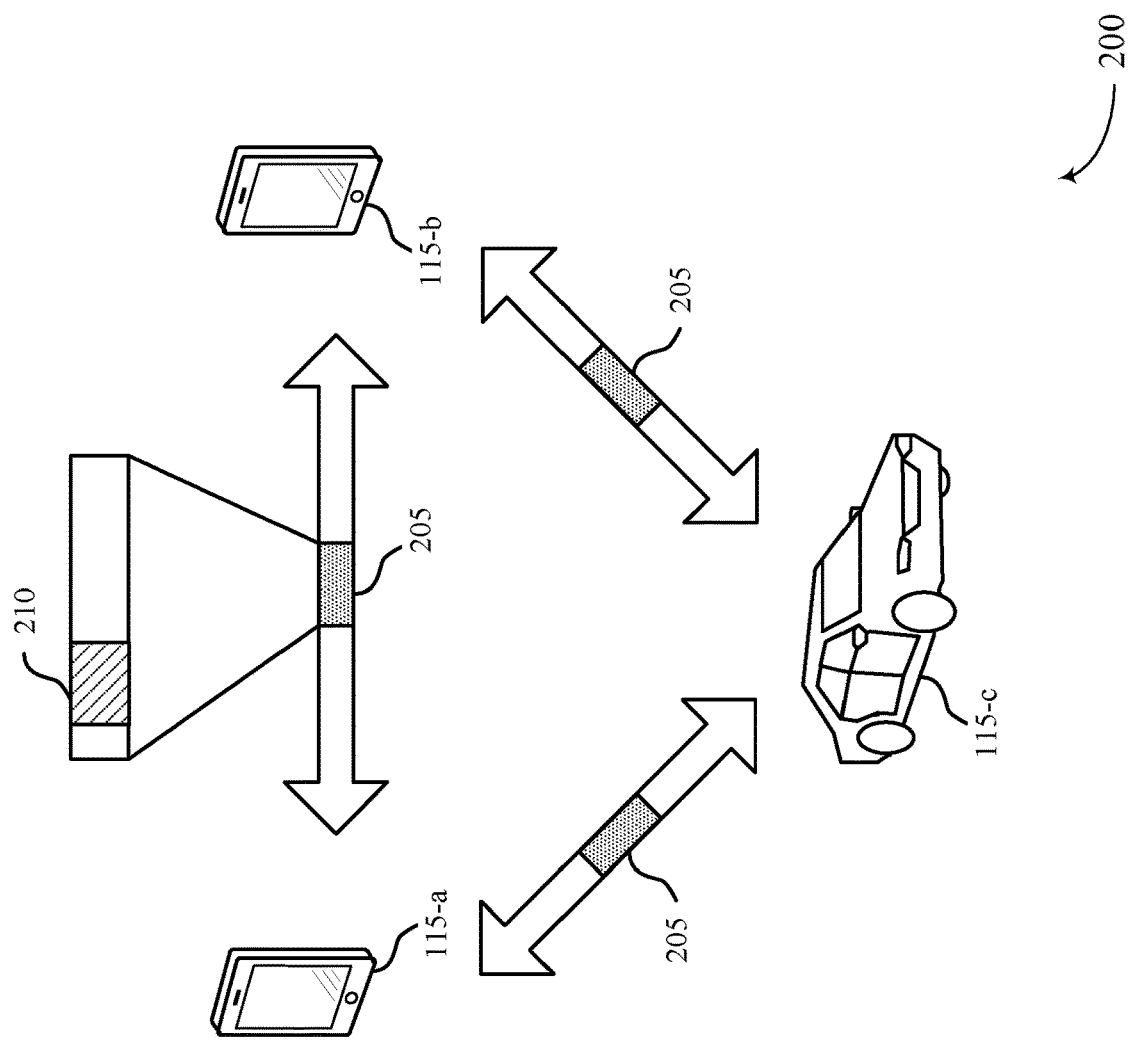
FIG. 2 illustrates an example of a system for wireless communications that supports DRX operations for wireless communications systems in accordance with aspects of the present disclosure.
Figure 2:
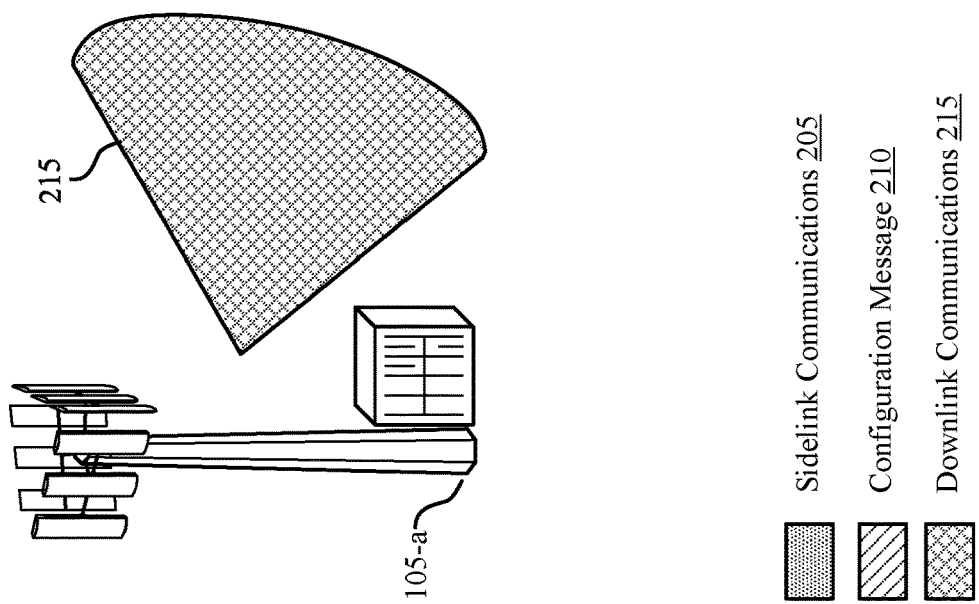

FIG. 2 illustrates an example of a wireless communications system 200 that supports DRX operations for wireless communications systems in accordance with aspects of the present disclosure. In some examples, wireless communications system 200 may implement aspects of wireless communications system 100 and may include a group of UEs 115 (e.g., a UE 115-a, a UE 115-b, and a UE 115-c) and a base station 105-a, which may be examples of UEs 115 and a base station 105, respectively, described with reference to FIG. 1. In some cases, the group of UEs 115 may communicate with each other (e.g., within a V2X system, a D2D system, and the like) and may employ DRX operations to save power and ensure reliable communications.

According to some aspects, the group of UEs 115 may communicate with each other (or with another group of UEs 115) over sidelink communications 205 (e.g., using a peer-to-peer (P2P) or D2D protocol). For example, the UE 115-a may monitor resource pools for the sidelink communications 205 or indications of the sidelink communications 205 (e.g., resource reservations, control channel transmissions, among other examples) from the UEs 115-b and 115-c. Additionally or alternatively, the UE 115-a may have data to transmit to one or more of the UE 115-b or the UE 115-c and may use the sidelink communications 205 to transmit the data.

In some examples, the group of UEs 115 may utilize sidelinks (e.g., the sidelink communications 205) in addition to access links with the base station 105-a. For example, one or more of the UEs 115 may be in a coverage area (e.g., a coverage area 110 with reference to FIG. 1) of the base station 105-a. In such examples, a UE 115 may communicate with the base station 105-a via a Uu interface (e.g., the base station 105-a may transmit downlink communications 215 to one or more of the UEs 115). In some other examples, the group of UEs 115 may not be inside the coverage area or may not communicate with the base station 105-a using an access link. In some cases, the UEs 115 may be configured with DRX settings that are based on inactivity timers as described with reference to FIG. 1 (e.g., configured for Uu interfaces by the base station 105-a). However, such inactivity timers may result in one or more of the UEs 115 having varying DRX parameters or different awake periods, which may result in missing the sidelink communications 205.

In some examples, the UE 115-a may be a group leader of the group of UEs 115 (e.g., the UEs 115-b, 115-c). In some examples, the UE 115-a may be visible as the group leader at an AS layer. For example, the UE 115-a may perform group leader functions in the group of UEs 115, such as AS layer functions to manage the UEs 115-b, 115-c. The group leader functions may include performing resource management for the group of UEs 115. For example, in a V2X system, the UE 115-a may be an RSU or a special leader in a platoon of UEs 115 and may perform resource management, scheduling, and the like for the UEs 115-b, 115-c. The UEs 115-b, 115-c may search for the group leader UE 115 at the AS layer and determine that the UE 115-a is the group leader.

In some other examples, the group of UEs 115 may not have a visible group leader at the AS layer. That is, the UEs 115-a, 115-b, and 115-c may have the same capabilities (e.g., configurations, settings, operations to perform, etc.) at the AS layer. Additionally or alternatively, any UE 115 may transmit to another UE 115 in the group of UEs 115 without resource management being performed by another UE 115. For example, the UE 115-a may reserve resources from a sidelink resource pool for groupcast transmissions. In such examples, the group management of the UEs 115 may occur at the application layer.

In some examples, the UE 115-a may be configured to be the group leader. For example, an upper layer may select or configure the UE 115-a to be the group leader in the group of UEs 115. The upper layer may be an upper layer of a layered protocol stack such as PDCP layer, an RLC layer, a MAC layer, an RRC protocol layer, etc. For example, the upper layer signaling protocol may include the PC5-S protocol, or the application layer signaling protocol (e.g., defined in system architecture evolution (SAE) or the European Telecommunications Standards Institute Intelligent Transport Systems (ETSI-ITS)). As an example, the UE 115-a may be selected as a group leader (e.g., a platoon leader of the UEs 115 in a V2X, D2D, or V2V system) by the upper layer. The upper layer may inform the V2X layer that the UE 115-a is designated as the group leader. The upper layer or the V2X layer may also configure the UE 115-a with group leader capabilities or operations such as DRX control management. For example, the upper layer may configure the UE 115-a to consolidate traffic information of the UEs 115-b, 115-c, and determine a DRX configuration (e.g., including a DRX schedule) for the group of UEs 115, as well as configure the UEs 115 with the DRX configuration (e.g., via a DRX control message over a control channel). The upper layer or the V2X layer may also notify the group of UEs 115 that the UE 115-*a* has been designated at the group leader. For example, V2X layer may configure the UE 115-*a* with a group leader ID (e.g., layer 2 (L2) IDs) and indicate the group leader ID to the UEs 115-*b*, 115-*c*. The V2X layer may also configure the UEs 115-*b*, 115-*c* to monitor one or more resources for the DRX configuration (i.e., the DRX control message).

The UEs 115-*b*, 115-*c* may provide traffic information to the UE 115-*a* based on identifying that the UE 115-*a* is the group leader. For example, the UE 115-*b* may send the traffic information to the UE 115-*a* via a sidelink communication 205 (e.g., when the UE 115-*a* is visible at the AS layer). Additionally or alternatively, the UE 115-*b* may provide the traffic information via an application layer, which may provide the traffic information to the UE 115-*a* (e.g., when the UE 115-*a* is configured as the group leader by the upper layer). The traffic information may include information associated with the UE 115-*b*, such as a group ID or a member ID. The traffic information may also include a transmission schedule associated with one or more transmissions of the UE 115-*b*, such as a data rate, a periodicity, an offset, a QoS profile or indicator, a data amount, or any combination thereof.

In some examples, the traffic information may also include a request associated with the transmission schedule. For example, the UE 115-*b* may inform the group leader UE 115-*a* of planned communications associated with the UE 115-*b* (e.g., via the transmission schedule indicating one or more transmissions of the UE 115-*b*). The UE 115-*b* may monitor for a message from the UE 115-*a*. In some examples, the group leader UE 115-*a* may transmit an acknowledgment message in response to the request. The acknowledgement message may indicate that the UE 115-*b* may proceed with the planned communications (e.g., because the planned communications align with the group DRX configuration). In some other examples, the group leader UE 115-*a* may transmit an adjustment message to the UE 115-*b*. The adjustment message may indicate that the UE 115-*b* may adjust one or more of the planned communications, such that the planned communications align with the group DRX configuration (e.g., the UE 115-*b* may send a transmission while the group of UEs 115 are in an awake period and monitoring for the transmission).

In some examples, the UEs 115-*b*, 115-*c* may transmit traffic information associated with the UEs 115-*b*, 115-*c*, respectively, via an RRC message. For example, the UE 115-*b* may transmit an RRC message including or indicating the traffic information to the group leader UE 115-*a*. The traffic information may include a profile of the groupcast traffic (e.g., predicted and/or planned group communications) of the UE 115-*b*. For example, the traffic information may include a group ID of the UE 115-*b*, a member ID of the UE 115-*b*, a data rate of the traffic associated with the UE 115-*b*, a periodicity of the traffic associated with the UE 115-*b*, an offset of the traffic associated with the UE 115-*b*, a QoS profile of the traffic associated with the UE 115-*b*, among other examples.

As an example, the UE 115-*b* may have data to transmit to the group of UEs 115 (e.g., via a relatively high priority data transmission indicating an object or obstacle in a road in a V2V or V2X system). The UE 115-*b* may identify the group leader UE 115-*a* (e.g., based on an L2 ID) and transmit traffic information of the UE 115-*b*. The traffic information may include the group ID. The group ID may be an L2 ID of the group of UEs 115 (e.g., an index mapped to a 24-bit L2 Group ID address). The traffic information may also include the member ID. The member ID may be an L2 ID associated with the UE 115-*b*, an internal ID in the group of UEs 115 (e.g., an index assigned by the group leader UE 115-*a*) which may ensure privacy for the UE 115-*b* due to devices outside of the group being unaware of the internal ID for the UE 115-*b*, among other examples. The traffic information may also include the data rate (e.g., associated with a planned transmission of the UE 115-*b*), a periodicity (e.g., the planned transmission of the UE 115-*b* may utilize resources periodically based on the periodicity), an offset (e.g., an offset indicating when the planned transmission may begin), or a combination thereof. In some examples, the traffic information may also include a QoS profile. The QoS profile may include a priority of the traffic associated with the UE 115-*b*. For example, the QoS profile may indicate that the planned transmission has a relatively high priority and a relatively low delay budget (e.g., a 20 ms delay budget). The group leader UE 115-*a* may schedule the planned transmission accordingly to satisfy the delay budget indicated by the QoS profile.

In some examples, the UEs 115-*b*, 115-*c* may transmit traffic information associated with the UEs 115-*b*, 115-*c*, respectively, via a MAC control element (CE) message. For example, the UE 115-*b* may transmit a MAC-CE message including or indicating the traffic information to the group leader UE 115-*a*. The MAC-CE message may be relatively small in size which may enable more efficient communications (e.g., reduced processing overhead). The traffic information included in the MAC-CE message may include a group ID of the UE 115-*b* (e.g., a L2 group ID address), a member ID of the UE 115-*b* (e.g., an index assigned by the group leader UE 115-*a*), a buffered data amount of the traffic associated with the UE 115-*b*, a QoS indicator, among other examples. In some examples, the QoS indicator may indicate a QoS profile to the UE 115-*a*. For example, the QoS indicator may be an index associated with a packet flow identifier (PFI), or another logical channel (LCH) configured to be used for the planned transmission from the UE 115-*b* (e.g., a planned groupcast transmission to the group of UEs 115). The group leader UE 115-*a* may use the QoS indicator to determine the QoS profile for one or more transmissions of the UE 115-*b*, and determine the DRX configuration and/or schedule the one or more transmissions accordingly.

The group leader UE 115-*a* may receive the traffic information of the group of UEs 115 and consolidate the traffic information into group traffic information. For example, the UE 115-*b* may transmit traffic information associated with the UE 115-*b* (e.g., a transmission schedule indicating one or more planned transmissions) to the UE 115-*a*. The UE 115-*c* may also transmit traffic information associated with the UE 115-*c* to the UE 115-*a*. The UE 115-*a* may consolidate the traffic information of the UE 115-*b* and the traffic information of the UE 115-*c* into group traffic information. The group traffic information may include transmission schedules for the group of UEs 115 (e.g., resources of a sidelink resource pool reserved or indicated by each UE 115 of the group of UEs 115).

The UE 115-*a* may determine a DRX configuration based on the group traffic information. For example, the UE 115-*a* may configure the group of UEs 115 with a DRX configuration that may enable the UEs 115 to reduce power consumption. The DRX configuration may include a DRX schedule indicating one or more DRX cycles (e.g., a time period where the UEs 115 may operate in a DRX mode configured by the DRX configuration). For example, the DRX schedule may indicate a DRX cycle and an awake period (i.e., an ON duration) of the DRX cycle. The group of UEs 115 may monitor for sidelink communications 205 during the awake period of the DRX cycle and powering down radio components for a "sleep" period of the DRX cycle.

In some examples, the DRX schedule may be configured for a single DRX cycle. In other words, the DRX configuration may be a "one-shot" configuration. In such examples, the group of UEs 115 may operate in the configured DRX mode until the end of the DRX cycle has ended. The group of UEs 115 may then revert back to a previous default monitoring configuration (e.g., continuous monitoring and/or a default inactivity timer based monitoring). In some examples, the DRX schedule may be configured for multiple DRX cycles. In other words, the configuration may be a repetitive configuration. For example, the DRX schedule may be periodic and the group of UEs 115 may continue to operate in the configured DRX mode for subsequent DRX cycles. In such examples, the UE 115-*a* may transmit a termination message (e.g., a groupcast message) in a DRX cycle of the multiple DRX cycles. The termination message may indicate to the group of UEs that the DRX configuration may be terminated (e.g., when the DRX cycle of the termination message lapses, or when another DRX cycle lapses, such as a subsequent DRX cycle). For example, the UE 115-*b* may receive a termination message from the UE 115-*a* and may revert back to a previous monitoring configuration (e.g., continuous monitoring and/or inactivity timer based monitoring) based on the termination message.

In some examples, the UE 115-*a* may determine a group traffic schedule by performing scheduling (e.g., resource allocation of a sidelink resource pool) for the group of UEs 115 based on the received traffic information. For example, the UE 115-*a* may allocate resources (e.g., requested by the UE 115-*b*) for a high priority transmission of the UE 115-*b* such that the high priority transmission satisfies a delay budget (e.g., 20 ms), aligns with the determined DRX configuration (e.g., the DRX schedule includes an awake period that includes the resources for the high priority transmission), or a combination thereof. In some cases, the UE 115-*a* may transmit an acknowledgment message to the UE 115-*b* indicating that the UE 115-*b* may proceed with transmitting the high priority transmission. That is, the UE 115-*b* may receive the acknowledgement message in response to transmitting the traffic information of the UE 115-*b* (e.g., including a request to utilize the resources for the high priority transmission) and the UE 115-*b* may transmit the high priority transmission as planned.

Additionally or alternatively, the UE 115-*a* may allocate different resources for a relatively low priority transmission of the UE 115-*c*. For instance, the UE 115-*c* may indicate resources for the transmission (e.g., a request and/or a plan to utilize resources for the transmission) to the UE 115-*a* via the traffic information. The UE 115-*a* may determine that the indicated resources may interfere with the high priority transmission of the UE 115-*b*, that the indicated resources fail to align with a DRX configuration (e.g., some or all of the indicated resources are not included in an awake period of the DRX schedule), or a combination thereof. Accordingly, the UE 115-*a* may allocate different resources for the transmission. In some cases, the UE 115-*a* may transmit an adjustment message to the UE 115-*c* indicating that the transmission has been allocated to different resources. For example, the UE 115-*c* may receive the adjustment message and adjust the transmission schedule of the UE 115-*c* such that the transmission utilizes the different resources of the sidelink resource pool.

The group of UEs 115 may monitor for a configuration message 210 from the group leader. For example, the UE 115-*b* and/or the UE 115-*c* may monitor for the configuration message 210 from the UE 115-*a*. The configuration message 210 may be included in a sidelink communication 205 (e.g., a groupcast transmission, a control channel transmission, an RRC message, a MAC-CE message, or any combination thereof). In some examples, the UE 115-*b* may monitor continuously until receiving the configuration message 210 from the UE 115-*a* to ensure that the UE 115-*b* does not fail to receive any sidelink communications 205 (e.g., communications including the configuration message 210 or any subsequent messages, sidelink communications 205 from other UEs 115, among other examples).

The configuration message 210 can include and/or indicate the DRX configuration. For example, the UE 115-*a* may determine the DRX configuration as described herein and configure the group of UEs 115 with the DRX configuration via the configuration message 210. In some examples, the configuration message 210 may be a groupcast message, for example, when the DRX configuration is determined for the group of UEs 115 such that the group member UEs 115 may implement the same DRX schedule (e.g., each UE 115 may be configured with the same awake periods). The configuration message 210 may include an awake period (e.g., an ON duration) and a time period that the UEs 115 may implement the DRX configuration (e.g., a DRX cycle). In some examples, the configuration message 210 may include an indication of whether the DRX configuration is one-shot or repetitive (e.g., whether the UEs 115 should operate in the DRX mode for one DRX cycle or for multiple DRX cycles). For example, the configuration message 210 may indicate that the DRX configuration is a one-shot configuration and the group of UEs 115 may determine to terminate the DRX configuration (e.g., operating in the DRX mode) after the DRX cycle (e.g., when the DRX cycle lapses). Additionally or alternatively, the configuration message 210 may indicate that the DRX configuration is a repetitive configuration and the groups of UEs 115 may operate in the DRX mode until receiving another groupcast message (e.g., including a termination message as described herein).

In some examples, the UE 115-*a* may transmit the configuration message 210 via an RRC message (e.g., a PC5-RRC message). In some other examples, the UE 115-*a* may transmit the configuration message 210 via a MAC-CE message. The MAC-CE message may be relatively small, which may reduce processing overhead (e.g., in a repetitive DRX configuration where the configuration message 210 may be broadcast periodically). For example, the MAC-CE message may include and/or indicate a group ID (e.g., a group index), one or more awake periods (i.e., ON durations), one or more DRX cycles, a Boolean indicating whether the configuration is repetitive or one-shot (e.g., the configuration message 210 may include a field including the Boolean indication), or any combination thereof.

The group of UEs 115 (e.g., the UE 115-*b* and the UE 115-*c*) may receive the configuration message 210 and implement the DRX configuration. Therefore, the group member UEs 115 may perform power saving techniques while maintaining reliable communications in the wireless communications system 200. For example, the UE 115-*b* may monitor for sidelink communications 205 during a configured awake period and refrain from monitoring during the rest of a configured DRX cycle (e.g., by powering down radio components of the UE 115-*b*) to reduce power consumption. Additionally or alternatively, the UE 115-*b* may adjust a transmission schedule based on the configuration message 210 such that communications of the UE 115-*b* align with the DRX schedule and/or utilize resources that may not interfere with transmissions from other UEs 115 (e.g., UE 115-*c*).

Figure 3:
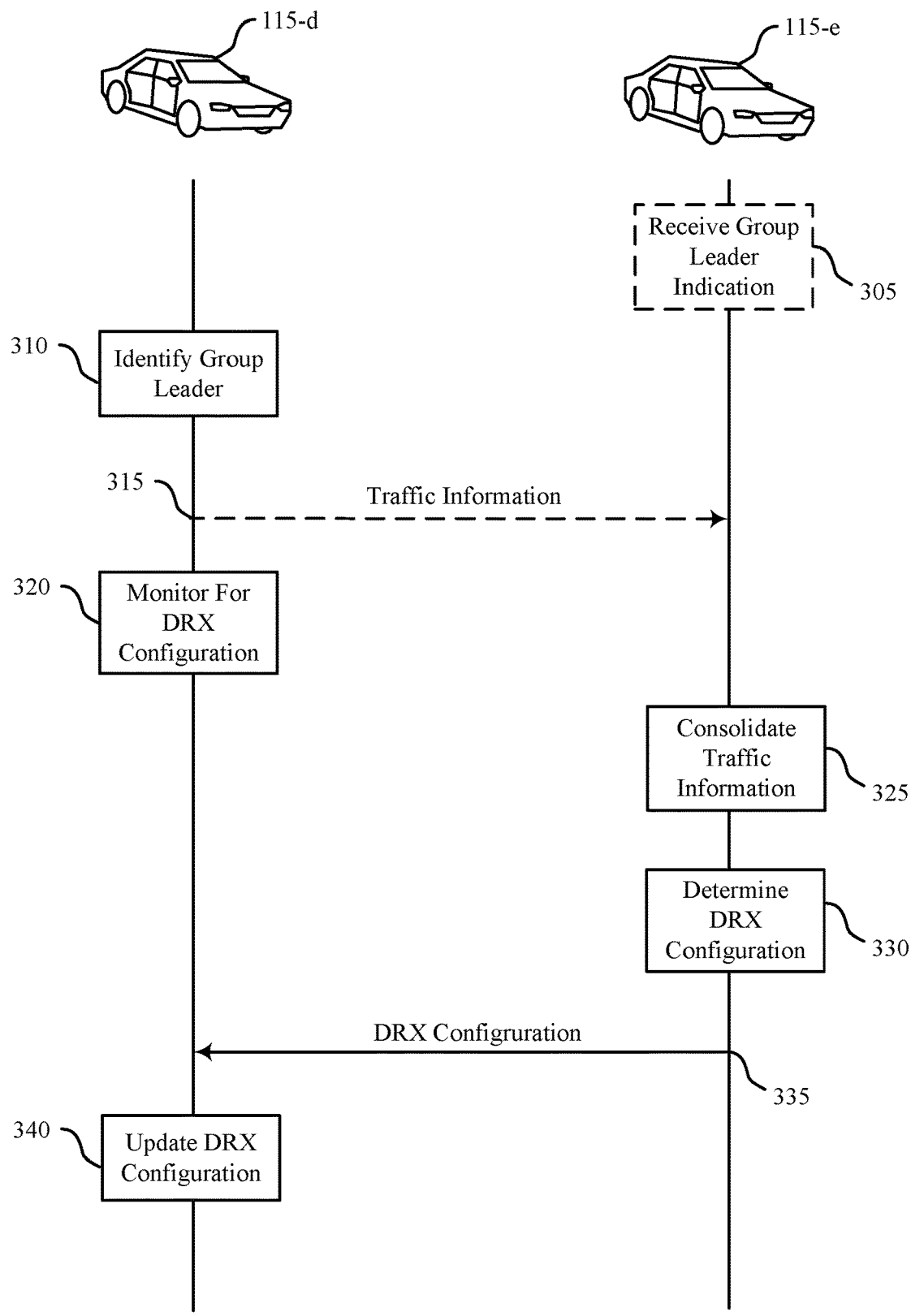
FIG. 3 illustrates an example of a flowchart that supports DRX operations for wireless communications systems in accordance with aspects of the present disclosure.

FIG. 3 illustrates an example of a process flow 300 that supports DRX operations for wireless communications systems in accordance with aspects of the present disclosure. In some examples, process flow 300 may implement aspects of wireless communications systems 100 or 200. The process flow 300 may include a UE 115-*d* and a UE 115-*e*, which may be examples of UEs 115 (e.g., UEs 115-*a*, 115-*b*, and 115-*c*) as described with reference to FIGS. 1 and 2.

In the following description of the process flow 300, the operations between the UE 115-*d* and the UE 115-*e* may be transmitted in a different order than the order shown, or the operations performed by between the UE 115-*d* and the UE 115-*e* may be performed in different orders or at different times. Some operations may also be left out of the process flow 300, or other operations may be added to the process flow 300. It is to be understood that while the UE 115-*d* and the UE 115-*e* are shown performing a number of the operations of process flow 300, any wireless device may perform the operations shown.

At 305, the UE 115-*e* may optionally receive a group leader indication. For example, there may not be a group leader of a group of UEs (e.g., including the UE 115-*e* and the UE 115-*d*) visible at an AS layer. An upper layer may select the UE 115-*e* as the group leader and notify a V2X layer of the UE 115-*e* that the UE 115-*e* is the group leader. Additionally or alternatively, the UE 115-*e* may be visible at the AS layer as the group leader (e.g., the UE 115-*e* may perform resource management for the group of UEs 115).

At 310, the UE 115-*d* may identify the group leader of the group of UEs. For example, the UE 115-*d* may determine an L2 ID of the group leader, may be notified by a V2X layer of the group leader, among other examples as described with reference to FIG. 2.

At 315, the UE 115-*d* may provide traffic information to the group leader (e.g., the UE 115-*e*). The traffic information may be an example of the traffic information of the UE 115-*b* as described with reference to FIG. 2. For example, the traffic information may indicate a group ID, a member ID, and a transmission schedule of the UE 115-*d*. In some examples, the UE 115-*d* may transmit the traffic information via an RRC message or a MAC-CE message, among other examples.

At 320, the UE 115-*d* may monitor for a DRX configuration. For example, the UE 115-*d* may be configured (e.g., by a V2X layer) or may determine to monitor for a groupcast transmission from the UE 115-*e* based on identifying that the UE 115-*e* is the group leader. In some examples, the UE 115-*d* may monitor continuously until receiving the DRX configuration, for example, to reduce the likelihood of missing communications from the group of UEs 115.

At 325, the UE 115-*e* may consolidate traffic information. For example, the UE 115-*e* may receive traffic information from one or more UEs 115 of the group of UEs (e.g., UE 115-*d*) indicating a transmission schedule associated with the one or more UEs 115. The UE 115-*e* may aggregate the traffic information into group traffic information (e.g., group traffic information as described with reference to FIG. 2).

At 330, the UE 115-*e* may determine a DRX configuration. For example, the UE 115-*e* may determine a DRX configuration based on the consolidated traffic information for the group of UEs 115, such that the group of UEs 115 may implement power saving strategies (e.g., refraining from monitoring for communications during a DRX cycle of the DRX configuration) while ensuring reliable sidelink communications. The DRX configuration may be an example of the DRX configuration described with reference to FIG. 2. At 335, the UE 115-*e* may transmit the DRX configuration. For example, the UE 115-*e* may broadcast the DRX configuration to the group of UEs 115 (e.g., including the UE 115-*d*) via a groupcast transmission (e.g., a MAC-CE message, a PC5-RRC message, among other examples).

At 340, the UE 115-*d* may update a DRX configuration based on the received DRX configuration at 335. For example, the UE 115-*d* may implement a DRX schedule included in the DRX configuration to reduce power consumption. In some examples, the UE 115-*d* may also adjust one or more transmissions to align with the DRX schedule (e.g., based on an adjustment message from the UE 115-*e*).

Figure 4:
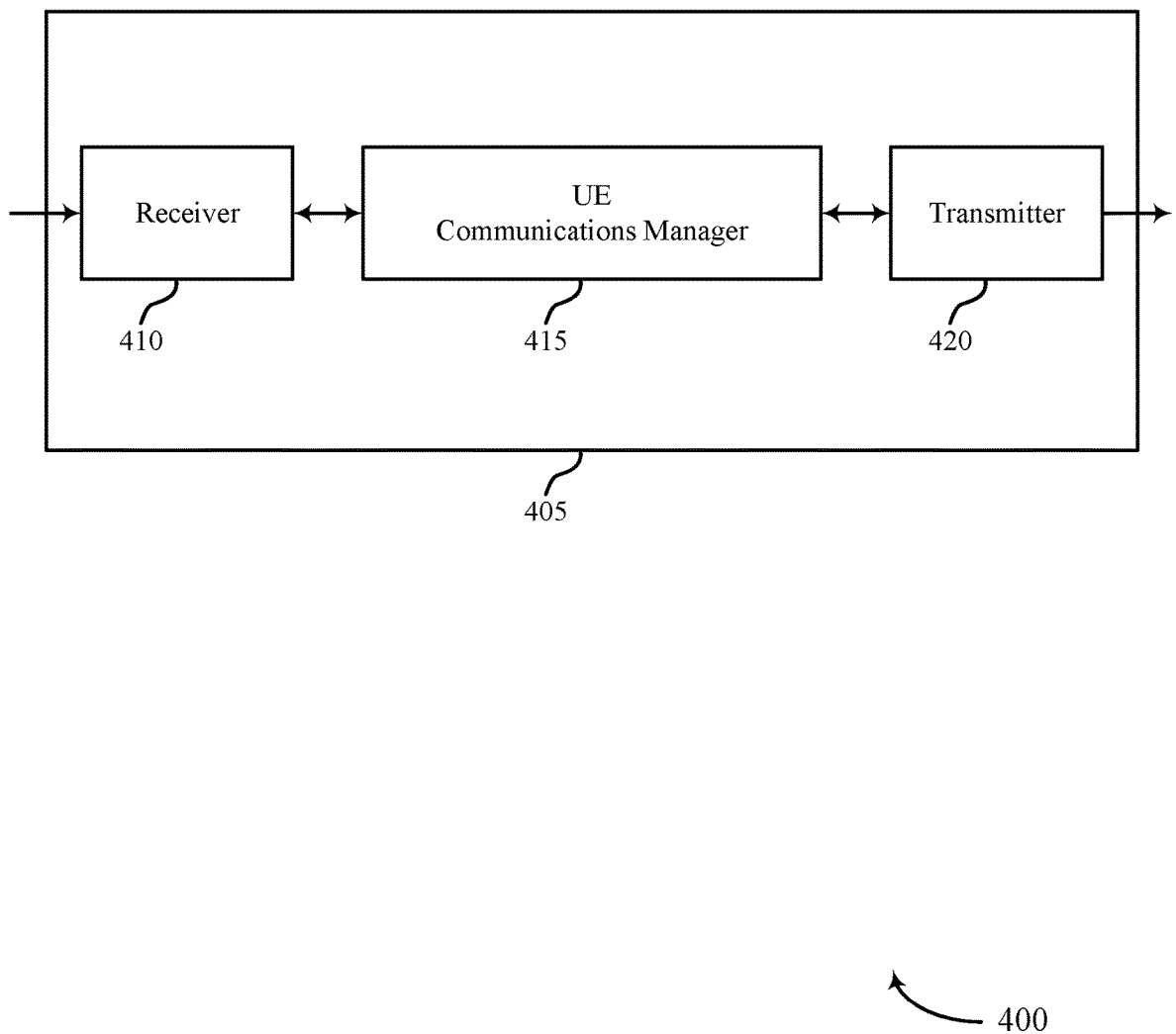
FIGS. 4 and 5 show block diagrams of devices that support DRX operations for wireless communications systems in accordance with aspects of the present disclosure.

FIG. 4 shows a block diagram 400 of a device 405 that supports DRX operations for wireless communications systems in accordance with aspects of the present disclosure. The device 405 may be an example of aspects of a UE 115 as described herein (e.g., a group leader UE 115-*a*, a group member UE 115-*b*, among other examples). The device 405 may include a receiver 410, a UE communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to DRX operations for wireless communications systems, etc.). Information may be passed on to other components of the device 405. The receiver 410 may be an example of aspects of the transceiver 720 described with reference to FIG. 7. The receiver 410 may utilize a single antenna or a set of antennas.

The UE communications manager 415 may receive, from a group member UE of the group of UEs, traffic information including a transmission schedule associated with traffic of the group member UE, determine a DRX configuration for the group of UEs based on the transmission schedule associated with the traffic of the group member UE, the DRX configuration including a DRX schedule for the group of UEs, and transmit, to the group of UEs, the DRX configuration. The UE communications manager 415 may also identify that a group leader UE in the group of UEs is a group leader of the group of UEs, monitor a resource based on identifying that the group leader UE is designated as the group leader, and receive, from the group leader UE, a group configuration message indicating a DRX configuration based on monitoring the resource. The UE communications manager 415 may be an example of aspects of the UE communications manager 710 described herein.

The UE communications manager 415, or its sub-components, may be implemented in hardware, code (e.g., software or firmware) executed by a processor, or any combination thereof. If implemented in code executed by a processor, the functions of the UE communications manager 415, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The UE communications manager 415, or its sub-components, may be physically located at various positions, including being distributed such that portions of functions are implemented at different physical locations by one or more physical components. In some examples, the UE communications manager 415, or its sub-components, may be a separate and distinct component in accordance with various aspects of the present disclosure. In some examples, the UE communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
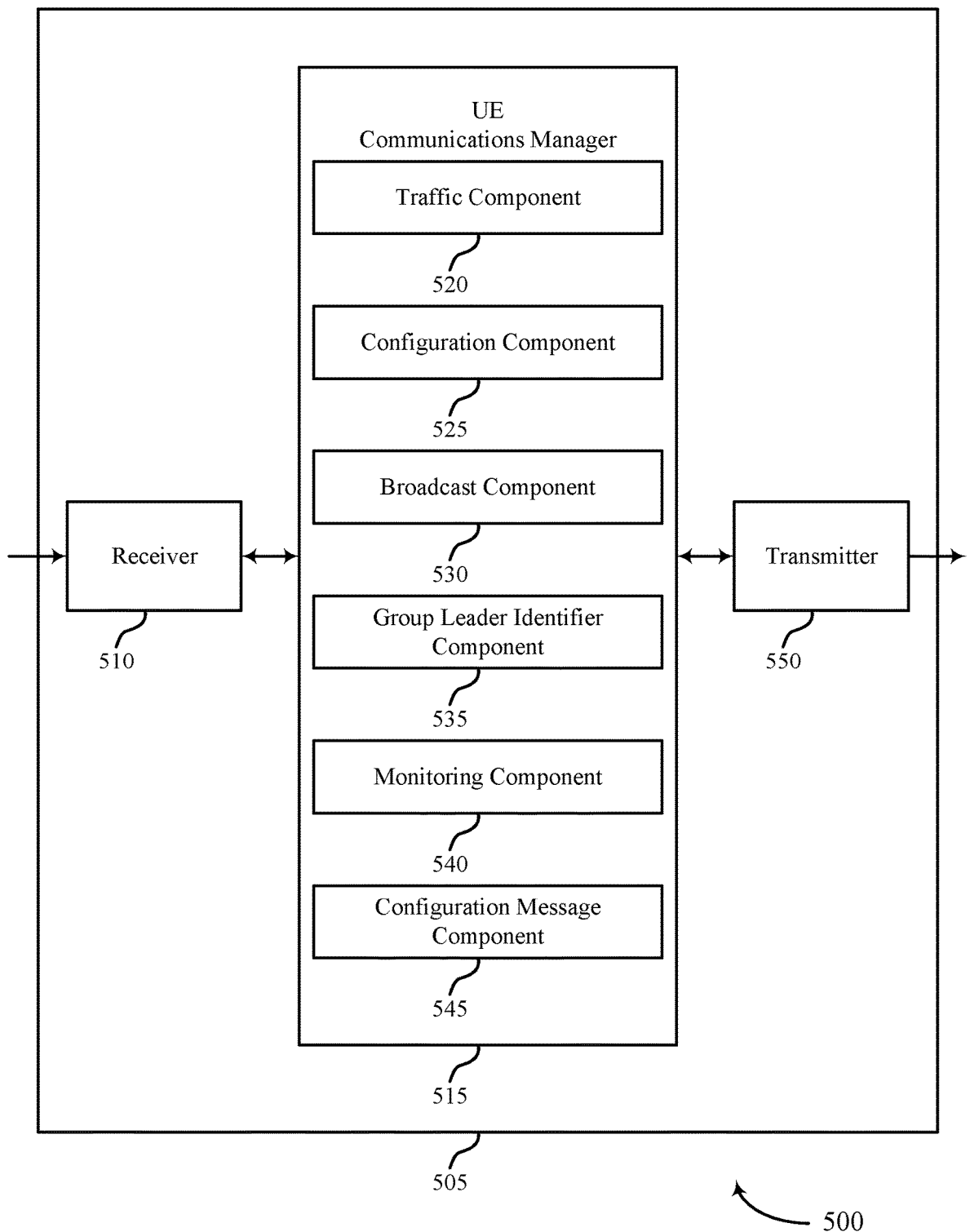

FIG. 5 shows a block diagram 500 of a device 505 that supports DRX operations for wireless communications systems in accordance with aspects of the present disclosure. The device 505 may be an example of aspects of a device 405, or a UE 115 as described herein (e.g., a group leader UE 115-a, a group member UE 115-b, among other examples). The device 505 may include a receiver 510, a UE communications manager 515, and a transmitter 550. The device 505 may also include a processor. Each of these components may be in communication with one another (e.g., via one or more buses).

The receiver 510 may receive information such as packets, user data, or control information associated with various information channels (e.g., control channels, data channels, and information related to DRX operations for wireless communications systems, etc.). Information may be passed on to other components of the device 505. The receiver 510 may be an example of aspects of the transceiver 720 described with reference to FIG. 7. The receiver 510 may utilize a single antenna or a set of antennas.

The UE communications manager 515 may be an example of aspects of the UE communications manager 415 as described herein. The UE communications manager 515 may include a traffic component 520, a configuration component 525, a broadcast component 530, a group leader identifier component 535, a monitoring component 540, and a configuration message component 545. The UE communications manager 515 may be an example of aspects of the UE communications manager 710 described herein.

The traffic component 520 may receive, from a group member UE of the group of UEs, traffic information including a transmission schedule associated with traffic of the group member UE. The configuration component 525 may determine a DRX configuration for the group of UEs based on the transmission schedule associated with the traffic of the group member UE, the DRX configuration including a DRX schedule for the group of UEs. The broadcast component 530 may transmit, to the group of UEs, the DRX configuration.

The group leader identifier component 535 may identify that a group leader UE in the group of UEs is a group leader of the group of UEs. The monitoring component 540 may monitor a resource based on identifying that the group leader UE is designated as the group leader. The configuration message component 545 may receive, from the group leader UE, a group configuration message indicating a DRX configuration based on monitoring the resource.

The transmitter 550 may transmit signals generated by other components of the device 505. In some examples, the transmitter 550 may be collocated with a receiver 510 in a transceiver module. For example, the transmitter 550 may be an example of aspects of the transceiver 720 described with reference to FIG. 7. The transmitter 550 may utilize a single antenna or a set of antennas.

Figure 6:
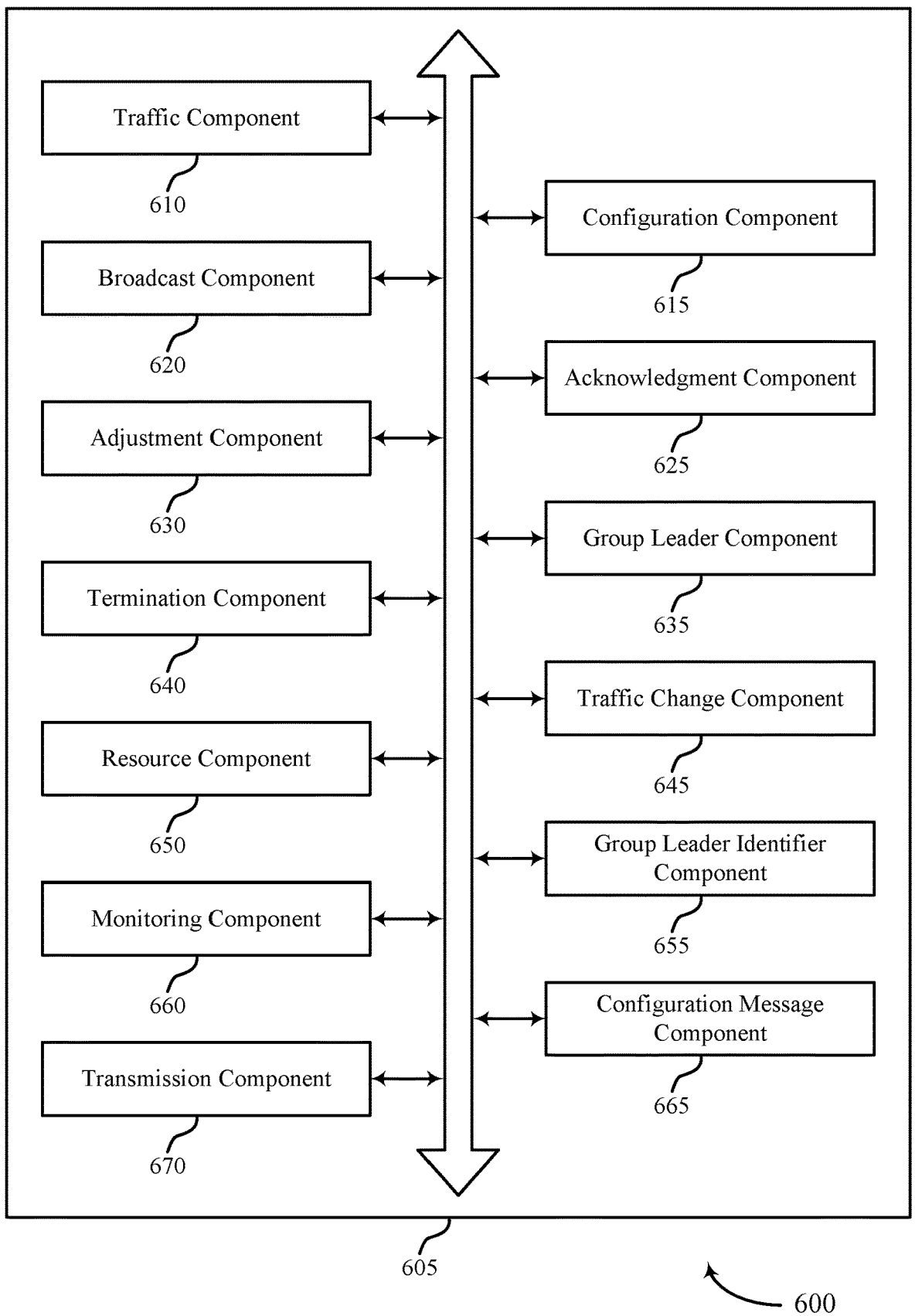
FIG. 6 shows a block diagram of a user equipment (UE) communications manager that supports DRX operations for wireless communications systems in accordance with aspects of the present disclosure.

FIG. 6 shows a block diagram 600 of a UE communications manager 605 that supports DRX operations for wireless communications systems in accordance with aspects of the present disclosure. The UE communications manager 605 may be an example of aspects of a UE communications manager 415, a UE communications manager 515, or a UE communications manager 710 described herein. The UE communications manager 605 may include a traffic component 610, a configuration component 615, a broadcast component 620, an acknowledgment component 625, an adjustment component 630, a group leader component 635, a termination component 640, a traffic change component 645, a resource component 650, a group leader identifier component 655, a monitoring component 660, a configuration message component 665, and a transmission component 670. Each of these modules may communicate, directly or indirectly, with one another (e.g., via one or more buses).

The traffic component 610 may receive, from a group member UE of the group of UEs, traffic information including a transmission schedule associated with traffic of the group member UE. In some cases, the group of UEs correspond to a vehicle-to-everything wireless communications system. In some examples, the traffic component 610 may consolidate the traffic information of the group member UE into group traffic information of the group of UEs, where determining the DRX configuration is based on the group traffic information. In some examples, the traffic component 610 may allocate resources requested by the second UE based on a priority indicated by the traffic information from the second UE, the discontinuous reception configuration, or both, where the allocated resources satisfy one or more thresholds associated with the priority, the discontinuous reception configuration, or both. In some examples, the traffic component 610 may receive, from an application layer of the group leader UE, one or more of the traffic information of the group member UE or one or more additional UEs of the group of UEs. In some examples, the traffic component 610 may transmit, to the group leader UE, traffic information including a transmission schedule associated with traffic of the group member UE.

In some examples, the traffic component 610 may transmit a PC5 radio resource control message to the group leader UE, the PC5 radio resource control message including the traffic information of the group member UE. In some examples, the traffic component 610 may transmit a medium access control-control element message to the group leader UE, the medium access control-control element message including the traffic information of the group member UE. In some cases, the traffic information includes a group identifier, a member identifier, a data rate, a periodicity, an offset, a QoS profile, or a combination thereof. In some cases, the traffic information includes a side link group identifier, a side link member identifier, a buffered data amount, a QoS indicator, or a combination thereof. In some cases, the traffic information comprises a group identifier, a member identifier, a data rate, a periodicity, an offset, a QoS profile, a side link group identifier, a side link member identifier, a buffered data amount, a QoS indicator, a combination thereof.

The configuration component 615 may determine a DRX configuration for the group of UEs based on the transmission schedule associated with the traffic of the group member UE, the DRX configuration including a DRX schedule for the group of UEs. In some examples, determining the DRX configuration is based on the group traffic information. In some examples, the configuration component 615 may configure the DRX configuration over a single DRX cycle or multiple DRX cycles. In some examples, the configuration component 615 may determine an awake period associated with a DRX cycle, where the DRX configuration includes an indication of the awake period associated with the DRX cycle. In some examples, the DRX configuration includes an indication of the DRX configuration terminating based on the awake period associated with the DRX cycle lapsing. In some examples, the configuration component 615 may determine multiple awake periods associated with multiple DRX cycles, where the DRX configuration includes an indication of the multiple awake periods associated with the multiple DRX cycles. In some examples, the configuration component 615 may enable a field in a message carrying the DRX configuration based on the configuring, the field including a Boolean indication of the single DRX cycle or the multiple DRX cycles, where transmitting, to the group of UEs, the DRX configuration includes transmitting, to each UE of the group of UEs, the message.

The broadcast component 620 may transmit, to the group of UEs, the DRX configuration. In some examples, transmitting, to the group of UEs, the DRX configuration is based on the group leader UE being the group leader of the group of UEs. In some examples, the broadcast component 620 may include the DRX configuration in a groupcast message, where transmitting, to the group of UEs, the DRX configuration includes transmitting, to each UE of the group of UEs, the groupcast message carrying the DRX configuration. In some examples, the broadcast component 620 may include the DRX configuration in a PC5 radio resource control message, where transmitting, to the group of UEs, the DRX configuration includes transmitting, to each UE of the group of UEs, the PC5 radio resource control message carrying the DRX configuration. In some examples, the broadcast component 620 may include the DRX configuration in a medium access control-control element message, where transmitting, to the group of UEs, the DRX configuration includes transmitting, to each UE of the group of UEs, the medium access control-control element message carrying the DRX configuration.

The group leader identifier component 655 may identify, by the group member UE in the group of UEs, that a group leader UE in the group of UEs is a group leader of the group of UEs. In some examples, the group leader identifier component 655 may receive, from an upper layer of the group member UE, a message indicating that the group leader UE is the group leader of the group of UEs. In some examples, the group leader identifier component 655 may determine that the group leader UE is a leader of a platoon including the group leader UE, that the group leader UE is a roadside unit, that the group leader UE performs a resource management operation for the group of UEs, or a combination thereof.

The monitoring component 660 may monitor a resource based on identifying that the group leader UE is designated as the group leader. In some examples, the monitoring component 660 may monitor, during the awake period of the DRX cycle, for transmissions from the group of UEs. In some examples, the monitoring component 660 may monitor, during the multiple awake periods associated with the multiple DRX cycles, for transmissions from the group of UEs.

The configuration message component 665 may receive, from the group leader UE, a group configuration message indicating a DRX configuration based on monitoring the resource. In some cases, the DRX configuration indicates an awake period associated with a DRX cycle. The acknowledgment component 625 may transmit an acknowledgement to the group member UE based on the traffic information including the transmission schedule associated with the traffic of the group member UE. In some examples, the acknowledgment component 625 may receive, from the group leader UE, an acknowledgment message based on transmitting the traffic information.

The adjustment component 630 may transmit an adjustment message to the group member UE based on the traffic information including the transmission schedule associated with the traffic of the group member UE, the adjustment message indicating to adjust one or more transmissions of the transmission schedule. In some examples, the adjustment component 630 may receive, from the group leader UE, an adjustment message based on transmitting the traffic information. In some examples, the adjustment component 630 may adjust one or more transmissions associated with the transmission schedule based on the adjustment message.

The group leader component 635 may receive, by a vehicle-to-everything layer of the group leader UE from an upper layer of the group leader UE, a configuration message including an indication that the group leader UE is a group leader of the group of UEs, where transmitting, to the group of UEs, the DRX configuration is based on the group leader UE being the group leader of the group of UEs. In some cases, the configuration message includes a group leader identifier. In some cases, the group leader identifier is a layer two identifier.

The traffic change component 645 may determine a traffic change associated with the group of UEs based on group traffic information. The termination component 640 may terminate the DRX configuration over the multiple awake periods associated with the multiple DRX cycles based on the traffic change. In some examples, the termination component 640 may receive, during an awake period of the multiple awake periods and a DRX cycle of the multiple DRX cycles, a termination message from the group leader UE, the termination message indicating that the DRX configuration is terminated for subsequent DRX cycles. In some examples, the termination component 640 may terminate the DRX configuration based on the awake period associated with the DRX cycle lapsing, where the DRX configuration includes an indication of the DRX configuration terminating based on the awake period associated with the DRX cycle lapsing. In some examples, the termination component 640 may terminate the DRX configuration based on the awake period associated with the DRX cycle lapsing. The resource component 650 may perform a resource management operation for the group of UEs based on the DRX configuration. The transmission component 670 may transmit one or more transmissions associated with the transmission schedule based on the acknowledgment message.

Figure 7:
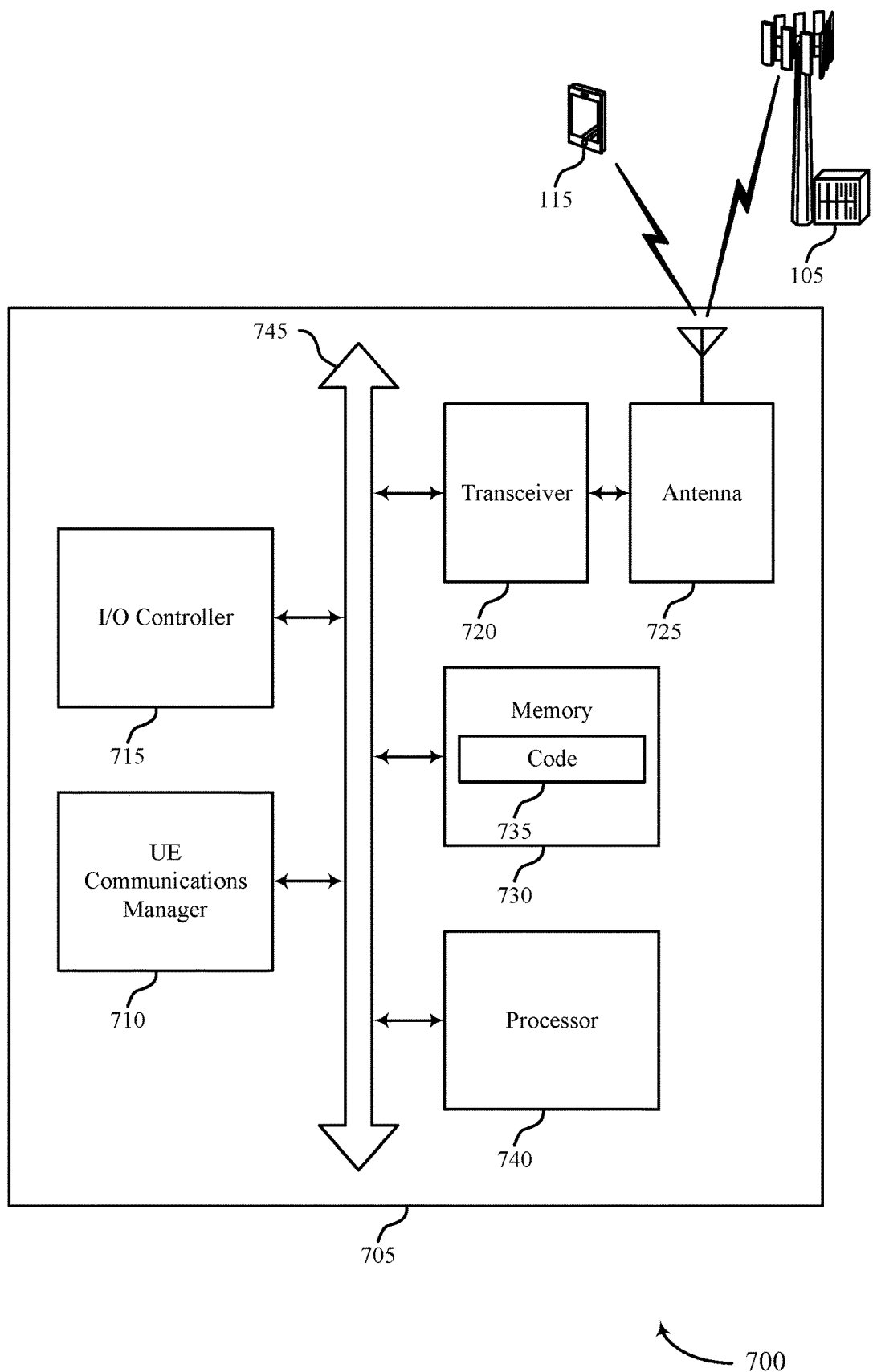
FIG. 7 shows a diagram of a system including a device that supports DRX operations for wireless communications systems in accordance with aspects of the present disclosure.

FIG. 7 shows a diagram of a system 700 including a device 705 that supports DRX operations for wireless communications systems in accordance with aspects of the present disclosure. The device 705 may be an example of or include the components of device 405, device 505, or a UE 115 (e.g., a group leader UE 115-a, a group member UE 115-b, among other examples) as described herein. The device 705 may include components for bi-directional voice and data communications including components for transmitting and receiving communications, including a UE communications manager 710, an I/O controller 715, a transceiver 720, an antenna 725, memory 730, and a processor 740. These components may be in electronic communication via one or more buses (e.g., bus 745).

The UE communications manager 710 may receive, from a group member UE of the group of UEs, traffic information including a transmission schedule associated with traffic of the group member UE, determine a DRX configuration for the group of UEs based on the transmission schedule associated with the traffic of the group member UE, the DRX configuration including a DRX schedule for the group of UEs, and transmit, to the group of UEs, the DRX configuration. The UE communications manager 710 may also identify, by the group member UE in the group of UEs, that a group leader UE in the group of UEs is a group leader of the group of UEs, monitor a resource based on identifying that the group leader UE is designated as the group leader, and receive, from the group leader UE, a group configuration message indicating a DRX configuration based on monitoring the resource.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas. In some cases, the device 705 may include a single antenna 725. However, in some cases the device 705 may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic input/output (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting DRX operations for wireless communications systems).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
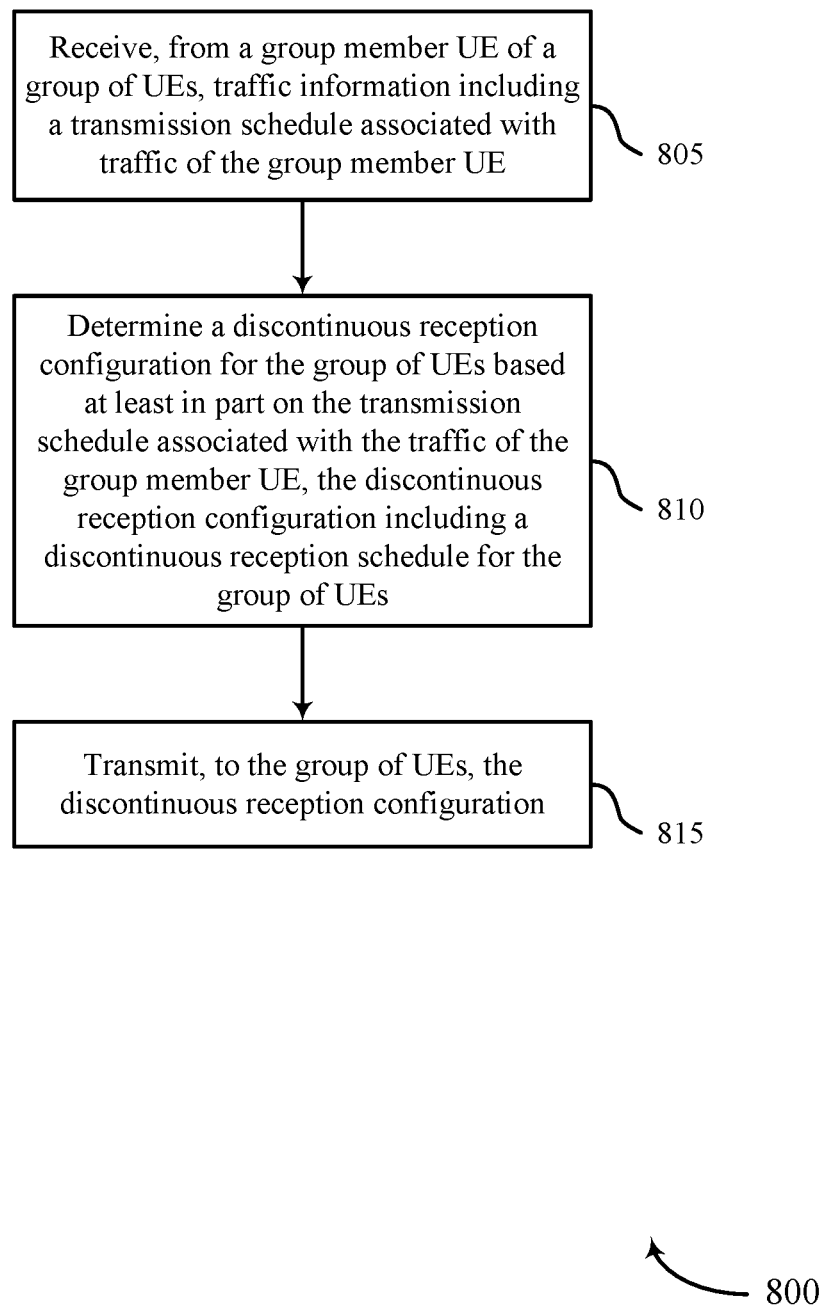
FIGS. 8 through 11 show flowcharts illustrating methods that support DRX operations for wireless communications systems in accordance with aspects of the present disclosure.

FIG. 8 shows a flowchart illustrating a method 800 that supports DRX operations for wireless communications systems in accordance with aspects of the present disclosure. The operations of method 800 may be implemented by a UE 115 (e.g., a group leader UE 115) or its components as described herein. For example, the operations of method 800 may be performed by a UE communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 805, the UE may receive, from a group member UE of a group of UEs, traffic information including a transmission schedule associated with traffic of the group member UE. The operations of 805 may be performed according to the methods described herein. In some examples, aspects of the operations of 805 may be performed by a traffic manager as described with reference to FIGS. 4 through 7.

At 810, the UE may determine a DRX configuration for the group of UEs based at least in part on the transmission schedule associated with the traffic of the group member UE, the DRX configuration including a DRX schedule for the group of UEs. The operations of 810 may be performed according to the methods described herein. In some examples, aspects of the operations of 810 may be performed by a configuration component as described with reference to FIGS. 4 through 7.

At 815, the UE may transmit, to the group of UEs, the DRX configuration. The operations of 815 may be performed according to the methods described herein. In some examples, aspects of the operations of 815 may be performed by a broadcast component as described with reference to FIGS. 4 through 7.

Figure 9:
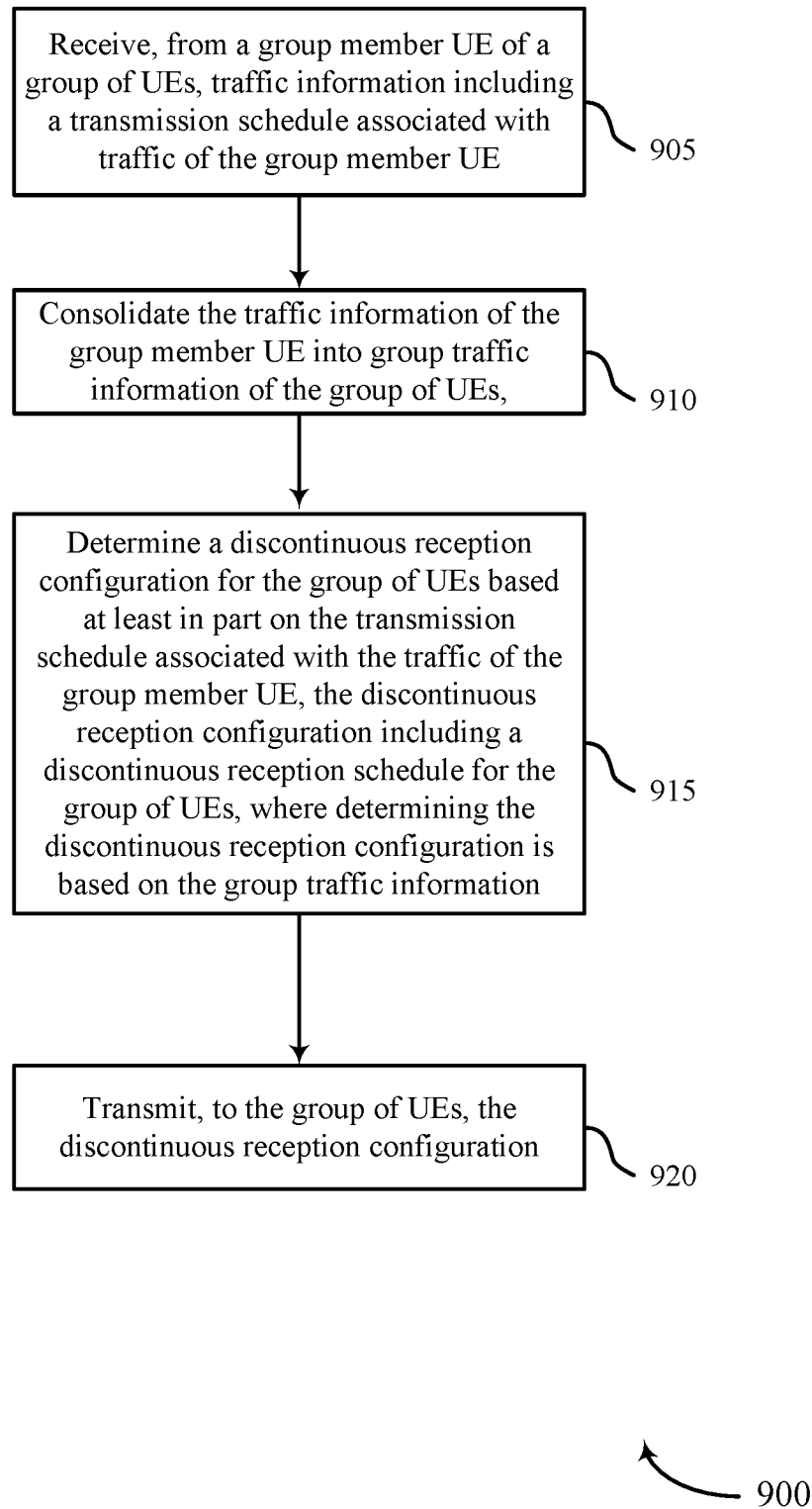

FIG. 9 shows a flowchart illustrating a method 900 that supports DRX operations for wireless communications systems in accordance with aspects of the present disclosure. The operations of method 900 may be implemented by a UE 115 (e.g., a group leader UE 115) or its components as described herein. For example, the operations of method 900 may be performed by a UE communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 905, the UE may receive, from a group member UE of a group of UEs, traffic information including a transmission schedule associated with traffic of the group member UE. The operations of 905 may be performed according to the methods described herein. In some examples, aspects of the operations of 905 may be performed by a traffic manager as described with reference to FIGS. 4 through 7.

At 910, the UE may consolidate the traffic information of the group member UE into group traffic information of the group of UEs. The operations of 910 may be performed according to the methods described herein. In some examples, aspects of the operations of 910 may be performed by a traffic manager as described with reference to FIGS. 4 through 7.

At 915, the UE may determine a DRX configuration for the group of UEs based at least in part on the transmission schedule associated with the traffic of the group member UE, the DRX configuration including a DRX schedule for the group of UEs, where determining the DRX configuration is based on the group traffic information. The operations of 915 may be performed according to the methods described herein. In some examples, aspects of the operations of 915 may be performed by a configuration component as described with reference to FIGS. 4 through 7.

At 920, the UE may transmit, to the group of UEs, the DRX configuration. The operations of 920 may be performed according to the methods described herein. In some examples, aspects of the operations of 920 may be performed by a broadcast component as described with reference to FIGS. 4 through 7.

Figure 10:
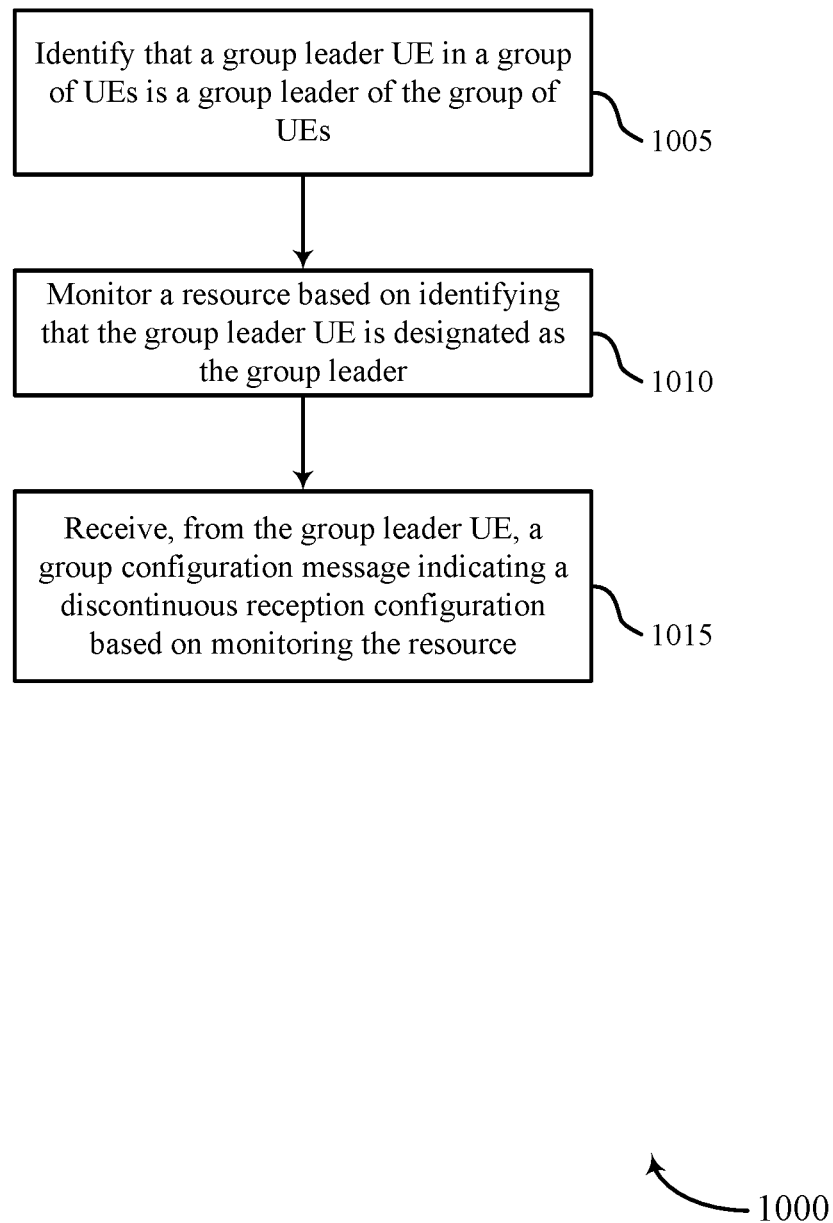

FIG. 10 shows a flowchart illustrating a method 1000 that supports DRX operations for wireless communications systems in accordance with aspects of the present disclosure. The operations of method 1000 may be implemented by a UE 115 (e.g., a group member UE 115) or its components as described herein. For example, the operations of method 1000 may be performed by a UE communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1005, the UE may identify that a group leader UE in a group of UEs is a group leader of the group of UEs. The operations of 1005 may be performed according to the methods described herein. In some examples, aspects of the operations of 1005 may be performed by a group leader identifier component as described with reference to FIGS. 4 through 7.

At 1010, the UE may monitor a resource based on identifying that the group leader UE is designated as the group leader. The operations of 1010 may be performed according to the methods described herein. In some examples, aspects of the operations of 1010 may be performed by a monitoring component as described with reference to FIGS. 4 through 7.

At 1015, the UE may receive, from the group leader UE, a group configuration message indicating a DRX configuration based on monitoring the resource. The operations of 1015 may be performed according to the methods described herein. In some examples, aspects of the operations of 1015 may be performed by a configuration message component as described with reference to FIGS. 4 through 7.

Figure 11:
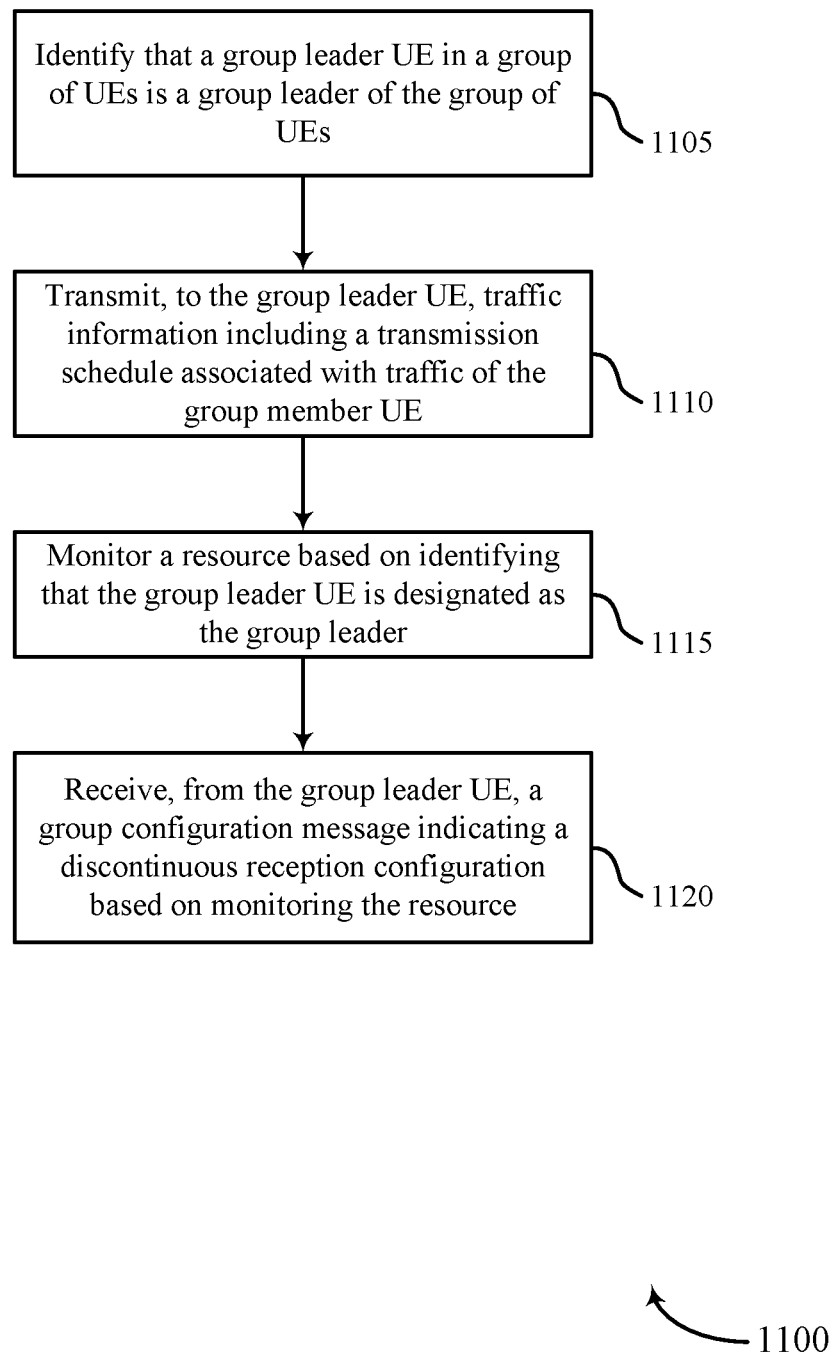

FIG. 11 shows a flowchart illustrating a method 1100 that supports DRX operations for wireless communications systems in accordance with aspects of the present disclosure. The operations of method 1100 may be implemented by a UE 115 (e.g., a group member UE 115) or its components as described herein. For example, the operations of method 1100 may be performed by a UE communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1105, the UE may identify that a group leader UE in a group of UEs is a group leader of the group of UEs. The operations of 1105 may be performed according to the methods described herein. In some examples, aspects of the operations of 1105 may be performed by a group leader identifier component as described with reference to FIGS. 4 through 7.

At 1110, the UE may transmit, to the group leader UE, traffic information including a transmission schedule associated with traffic of the group member UE. The operations of 1110 may be performed according to the methods described herein. In some examples, aspects of the operations of 1110 may be performed by a traffic manager as described with reference to FIGS. 4 through 7.

At 1115, the UE may monitor a resource based on identifying that the group leader UE is designated as the group leader. The operations of 1115 may be performed according to the methods described herein. In some examples, aspects of the operations of 1115 may be performed by a monitoring component as described with reference to FIGS. 4 through 7.

At 1120, the UE may receive, from the group leader UE, a group configuration message indicating a DRX configuration based on monitoring the resource. The operations of 1120 may be performed according to the methods described herein. In some examples, aspects of the operations of 1120 may be performed by a configuration message component as described with reference to FIGS. 4 through 7.

It should be noted that the methods described herein describe possible implementations, and that the operations and the steps may be rearranged or otherwise modified and that other implementations are possible. Further, aspects from two or more of the methods may be combined.

Example 1: A method for wireless communications at a first UE of a group of UEs, comprising: receiving, from a second UE of the group of UEs, traffic information comprising a transmission schedule associated with traffic of the second UE; determining a discontinuous reception configuration for the group of UEs based at least in part on the transmission schedule associated with the traffic of the second UE, the discontinuous reception configuration comprising a discontinuous reception schedule for the group of UEs; and transmitting, to the group of UEs, the discontinuous reception configuration.

Example 2: The method of example 1, further comprising: consolidating the traffic information of the second UE into group traffic information of the group of UEs; and wherein determining the discontinuous reception configuration is based at least in part on the group traffic information.

Example 3: The method of any of examples 1 or 2, wherein consolidating the traffic information of the second UE into the group traffic information of the group of UEs comprises: allocating resources requested by the second UE based at least in part on a priority indicated by the traffic information from the second UE, the discontinuous reception configuration, or both, wherein the allocated resources satisfy one or more thresholds associated with the priority, the discontinuous reception configuration, or both.

Example 4: The method of any of examples 1 to 3, further comprising: transmitting an adjustment message to the second UE based at least in part on the traffic information comprising the transmission schedule associated with the traffic of the second UE, the adjustment message indicating to adjust one or more transmissions of the transmission schedule.

Example 5: The method of any of examples 1 to 4, wherein the traffic information comprises a group identifier, a member identifier, a data rate, a periodicity, an offset, a quality of service (QoS) profile, a side link group identifier, a side link member identifier, a buffered data amount, a QoS indicator, a combination thereof.

Example 6: The method of any of examples 1 to 5, further comprising: receiving, by a vehicle-to-everything layer of the first UE from an upper layer of the first UE, a configuration message comprising an indication that the first UE is a group leader of the group of UEs; and wherein transmitting, to the group of UEs, the discontinuous reception configuration is based at least in part on the first UE being the group leader of the group of UEs.

Example 7: The method of any of examples 1 to 6, wherein the configuration message comprises a group leader identifier and wherein the group leader identifier is a layer two identifier.

Example 8: The method of any of examples 1 to 7, wherein receiving the traffic information comprises: receiving, from an application layer of the first UE, one or more of the traffic information of the second UE or one or more additional UEs of the group of UEs.

Example 9: The method of any of examples 1 to 8, further comprising: determining an awake period associated with a discontinuous reception cycle, wherein the discontinuous reception configuration comprises an indication of the awake period associated with the discontinuous reception cycle; terminating the discontinuous reception configuration based at least in part on the awake period associated with the discontinuous reception cycle lapsing; and wherein the discontinuous reception configuration comprises an indication of the discontinuous reception configuration terminating based at least in part on the awake period associated with the discontinuous reception cycle lapsing.

Example 10: The method of any of examples 1 to 9, further comprising: determining multiple awake periods associated with multiple discontinuous reception cycles, wherein the discontinuous reception configuration comprises an indication of the multiple awake periods associated with the multiple discontinuous reception cycles.

Example 11: The method of any of examples 1 to 10, further comprising: determining a traffic change associated with the group of UEs based at least in part on group traffic information; and terminating the discontinuous reception configuration over the multiple awake periods associated with the multiple discontinuous reception cycles based at least in part on the traffic change.

Example 12: The method of any of examples 1 to 11, further comprising: performing a resource management operation for the group of UEs based at least in part on the discontinuous reception configuration.

Example 13: The method of any of examples 1 to 12, further comprising: including the discontinuous reception configuration in a groupcast message, a PC5 radio resource control message, a medium access control-control element message, or any combination thereof, wherein transmitting, to the group of UEs, the discontinuous reception configuration comprises: transmitting, to each UE of the group of UEs, the groupcast message carrying the discontinuous reception configuration, the PC5 radio resource control message carrying the discontinuous reception configuration, the medium access control-control element message carrying the discontinuous reception configuration, or any combination thereof.

Example 14: The method of any of examples 1 to 13, further comprising: configuring the discontinuous reception configuration over a single discontinuous reception cycle or multiple discontinuous reception cycles; enabling a field in a message carrying the discontinuous reception configuration based at least in part on the configuring, the field comprising a Boolean indication of the single discontinuous reception cycle or the multiple discontinuous reception cycles.

Example 15: The method of any of examples 1 to 14, wherein the group of UEs correspond to a vehicle-to-everything wireless communications system.

Example 16: An apparatus comprising at least one means for performing a method of any of examples 1 to 15.

Example 17: An apparatus for wireless communications comprising a processor; memory coupled with the processor; and instructions stored in the memory and executable by the processor to cause the apparatus to perform a method of any of examples 1 to 15.

Example 18: A non-transitory computer-readable medium storing code for wireless communications, the code comprising instructions executable by a processor to perform a method of any of examples 1 to 15.

Example 19: A method for wireless communications at a first user equipment (UE) of a group of UEs, comprising: identifying, by the first UE in the group of UEs, that a second UE in the group of UEs is a group leader of the group of UEs; monitoring a resource based at least in part on identifying that the second UE is designated as the group leader; and receiving, from the second UE, a group configuration message indicating a discontinuous reception configuration based at least in part on monitoring the resource.

Example 20: The method of example 19, further comprising: transmitting, to the second UE, traffic information comprising a transmission schedule associated with traffic of the first UE.

Example 21: The method of any of examples 19 or 20, further comprising: receiving, from the second UE, an acknowledgment message based at least in part on transmitting the traffic information; and transmitting one or more transmissions associated with the transmission schedule based at least in part on the acknowledgment message.

Example 22: The method of any of examples 19 to 21, further comprising: receiving, from the second UE, an adjustment message based at least in part on transmitting the traffic information; and adjusting one or more transmissions associated with the transmission schedule based at least in part on the adjustment message.

Example 23: The method of any of examples 19 to 22, wherein transmitting the traffic information further comprises: transmitting a PC5 radio resource control message to the second UE, the PC5 radio resource control message comprising the traffic information of the first UE.

Example 24: The method of any of examples 19 to 23, wherein the traffic information comprises a group identifier, a member identifier, a data rate, a periodicity, an offset, a quality of service (QoS) profile, or a combination thereof.

Example 25: The method of any of examples 19 to 24, wherein transmitting the traffic information further comprises: transmitting a medium access control-control element message to the second UE, the medium access control-control element message comprising the traffic information of the first UE.

Example 26: The method of any of examples 19 to 25, wherein the traffic information comprises a side link group identifier, a side link member identifier, a buffered data amount, a quality of service (QoS) indicator, or a combination thereof.

Example 27: The method of any of examples 19 to 26, wherein the discontinuous reception configuration indicates an awake period associated with a discontinuous reception cycle, further comprising: monitoring, during the awake period of the discontinuous reception cycle, for transmissions from the group of UEs; and terminating the discontinuous reception configuration based at least in part on the awake period associated with the discontinuous reception cycle lapsing.

Example 28: The method of any of examples 19 to 27, wherein the discontinuous reception configuration indicates multiple awake periods associated with multiple discontinuous reception cycles, further comprising: monitoring, during the multiple awake periods associated with the multiple discontinuous reception cycles, for transmissions from the group of UEs.

Example 29: The method of any of examples 19 to 28, further comprising: receiving, during an awake period of the multiple awake periods and a discontinuous reception cycle of the multiple discontinuous reception cycles, a termination message from the second UE, the termination message indicating that the discontinuous reception configuration is terminated for subsequent discontinuous reception cycles.

Example 30: The method of any of examples 19 to 29, wherein identifying that the second UE is the group leader of the group of UEs further comprises: receiving, from an upper layer of the first UE, a message indicating that the second UE is the group leader of the group of UEs.

Example 31: The method of any of examples 19 to 30, wherein identifying that the second UE is the group leader of the group of UEs further comprises: determining that the second UE is a leader of a platoon comprising the first UE, that the second UE is a roadside unit, that the second UE performs a resource management operation for the group of UEs, or a combination thereof.

Example 32: An apparatus comprising at least one means for performing a method of any of examples 19 to 31.

Example 33: An apparatus for wireless communications comprising a processor; memory coupled with the processor; and instructions stored in the memory and executable by the processor to cause the apparatus to perform a method of any of examples 19 to 31.

Example 34: A non-transitory computer-readable medium storing code for wireless communications, the code comprising instructions executable by a processor to perform a method of any of examples 19 to 31.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first user equipment (UE) of a group of UEs, comprising:
   identifying, by the first UE in the group of UEs, that a second UE in the group of UEs is a group leader of the group of UEs;
   transmitting, to the second UE, traffic information comprising a transmission schedule associated with traffic of the first UE;
   monitoring a resource based at least in part on identifying that the second UE is designated as the group leader;
   receiving, from the second UE, a group configuration message indicating a discontinuous reception configuration based at least in part on monitoring the resource;
   receiving, from the second UE, an adjustment message based at least in part on transmitting the traffic information; and
   adjusting one or more transmissions associated with the transmission schedule based at least in part on the adjustment message.

2. The method of claim 1, further comprising:
   receiving, from the second UE, an acknowledgment message based at least in part on transmitting the traffic information; and
   transmitting one or more transmissions associated with the transmission schedule based at least in part on the acknowledgment message.

3. The method of claim 1, wherein transmitting the traffic information further comprises:
   transmitting a PC5 radio resource control message to the second UE, the PC5 radio resource control message comprising the traffic information of the first UE.

4. The method of claim 3, wherein the traffic information comprises a group identifier, a member identifier, a data rate, a periodicity, an offset, a quality of service (QOS) profile, or a combination thereof.

5. The method of claim 1, wherein transmitting the traffic information further comprises:
   transmitting a medium access control-control element message to the second UE, the medium access control-control element message comprising the traffic information of the first UE.

6. The method of claim 5, wherein the traffic information comprises a side link group identifier, a side link member identifier, a buffered data amount, a quality of service (QOS) indicator, or a combination thereof.

7. The method of claim 1, wherein the discontinuous reception configuration indicates an awake period associated with a discontinuous reception cycle, further comprising:
   monitoring, during the awake period of the discontinuous reception cycle, for transmissions from the group of UEs; and
   terminating the discontinuous reception configuration based at least in part on the awake period associated with the discontinuous reception cycle lapsing.

8. The method of claim 1, wherein the discontinuous reception configuration indicates multiple awake periods associated with multiple discontinuous reception cycles, further comprising:
   monitoring, during the multiple awake periods associated with the multiple discontinuous reception cycles, for transmissions from the group of UEs.

9. The method of claim 8, further comprising:
   receiving, during an awake period of the multiple awake periods and a discontinuous reception cycle of the multiple discontinuous reception cycles, a termination message from the second UE, the termination message indicating that the discontinuous reception configuration is terminated for subsequent discontinuous reception cycles.

10. The method of claim 1, wherein identifying that the second UE is the group leader of the group of UEs further comprises:
    receiving, from an upper layer of the first UE, a message indicating that the second UE is the group leader of the group of UEs.

11. The method of claim 1, wherein identifying that the second UE is the group leader of the group of UEs further comprises:
    determining that the second UE is a leader of a platoon comprising the first UE, that the second UE is a roadside unit, that the second UE performs a resource management operation for the group of UEs, or a combination thereof.

12. An apparatus of a group of apparatuses for wireless communications, comprising:
    a processor,
    memory coupled with the processor; and
    instructions stored in the memory and executable by the processor to cause the apparatus to:
    identify, by the apparatus in the group of apparatuses, that a second apparatus in the group of apparatuses is a group leader of the group of apparatuses;

transmit, to the second apparatus, traffic information comprising a transmission schedule associated with traffic of the apparatus;

monitor a resource based at least in part on identifying that the second apparatus is designated as the group leader;

receive, from the second apparatus, a group configuration message indicating a discontinuous reception configuration based at least in part on monitoring the resource;

receive, from the second apparatus, an adjustment message based at least in part on transmitting the traffic information; and adjust one or more transmissions associated with the transmission schedule based at least in part on the adjustment message.

13. The apparatus of claim 12, wherein the instructions are further executable by the processor to cause the apparatus to:

receive, from the second apparatus, an acknowledgment message based at least in part on transmitting the traffic information; and transmit one or more transmissions associated with the transmission schedule based at least in part on the acknowledgment message.

14. The apparatus of claim 12, wherein the instructions executable by the processor to cause the apparatus to transmit the traffic information are further executable by the processor to cause the apparatus to:

transmit a PC5 radio resource control message to the second apparatus, the PC5 radio resource control message comprising the traffic information of the apparatus.

15. The apparatus of claim 12, wherein the instructions executable by the processor to cause the apparatus to transmit the traffic information are further executable by the processor to cause the apparatus to:

transmit a medium access control-control element message to the second apparatus, the medium access control-control element message comprising the traffic information of the apparatus.

16. A non-transitory computer-readable medium storing code for wireless communication at a first user equipment (UE) of a group of UEs, the code comprising instructions executable by a processor to:

identify, by the first UE in the group of UEs, that a second UE in the group of UEs is a group leader of the group of UEs;

transmit, to the second UE, traffic information comprising a transmission schedule associated with traffic of the first UE;

monitor a resource based at least in part on identifying that the second UE is designated as the group leader;

receive, from the second UE, a group configuration message indicating a discontinuous reception configuration based at least in part on monitoring the resource;

receive, from the second UE, an adjustment message based at least in part on transmitting the traffic information; and adjust one or more transmissions associated with the transmission schedule based at least in part on the adjustment message.

\* \* \* \* \*